May 26, 1936.    R. RAGAN    2,041,860
HEDDLE AND METHOD OF MAKING THE SAME
Original Filed June 29, 1931    19 Sheets-Sheet 1
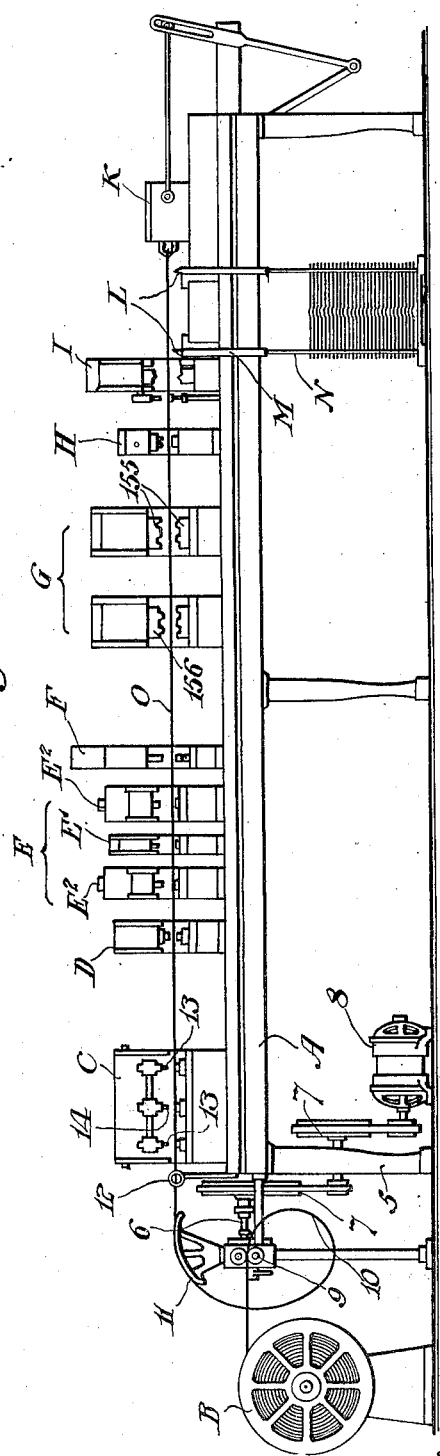
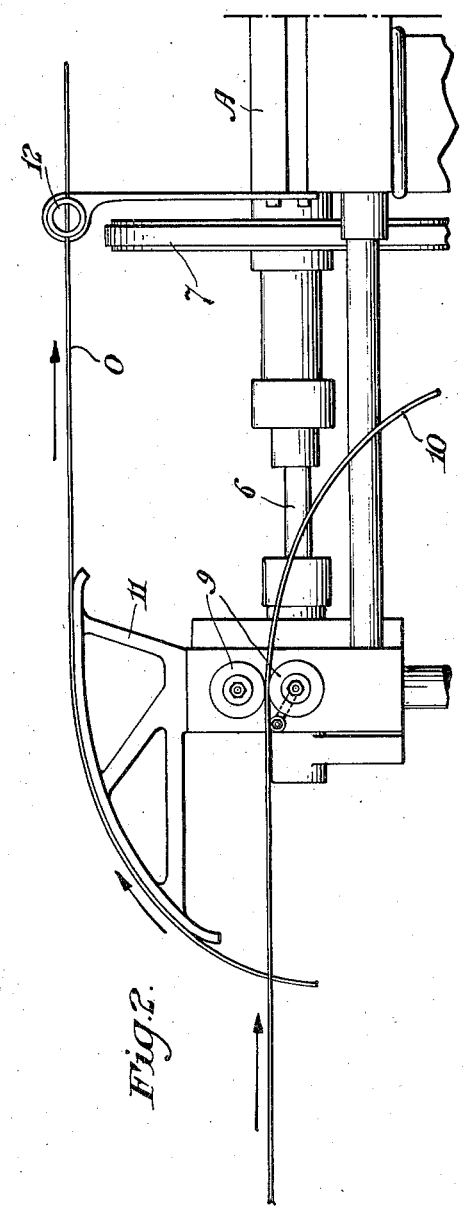
Inventor:
Ralph Ragan,
By Jas. C. Wobensmith
Attorney.

May 26, 1936.   R. RAGAN   2,041,860
HEDDLE AND METHOD OF MAKING THE SAME
Original Filed June 29, 1931   19 Sheets-Sheet 2
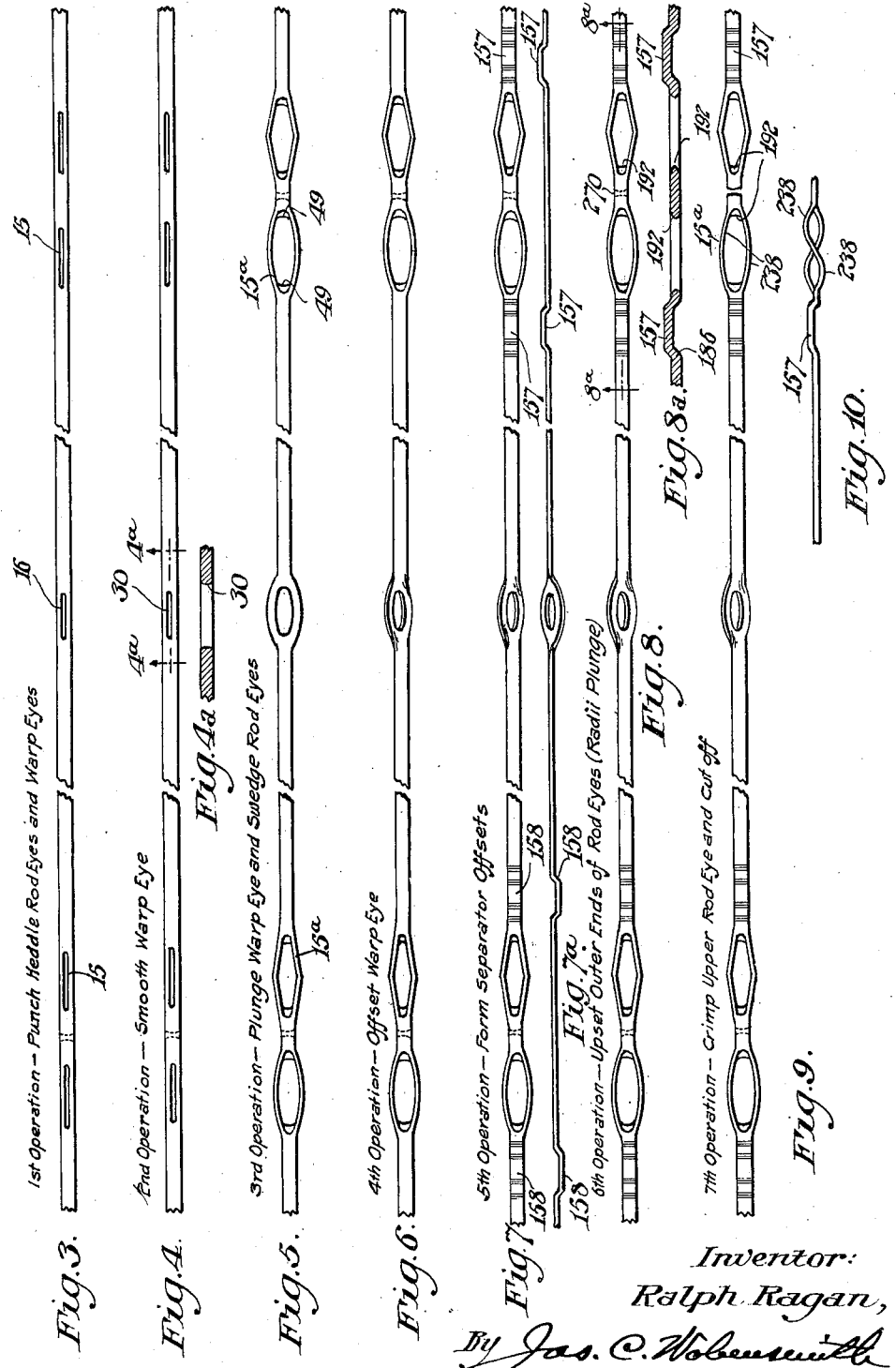

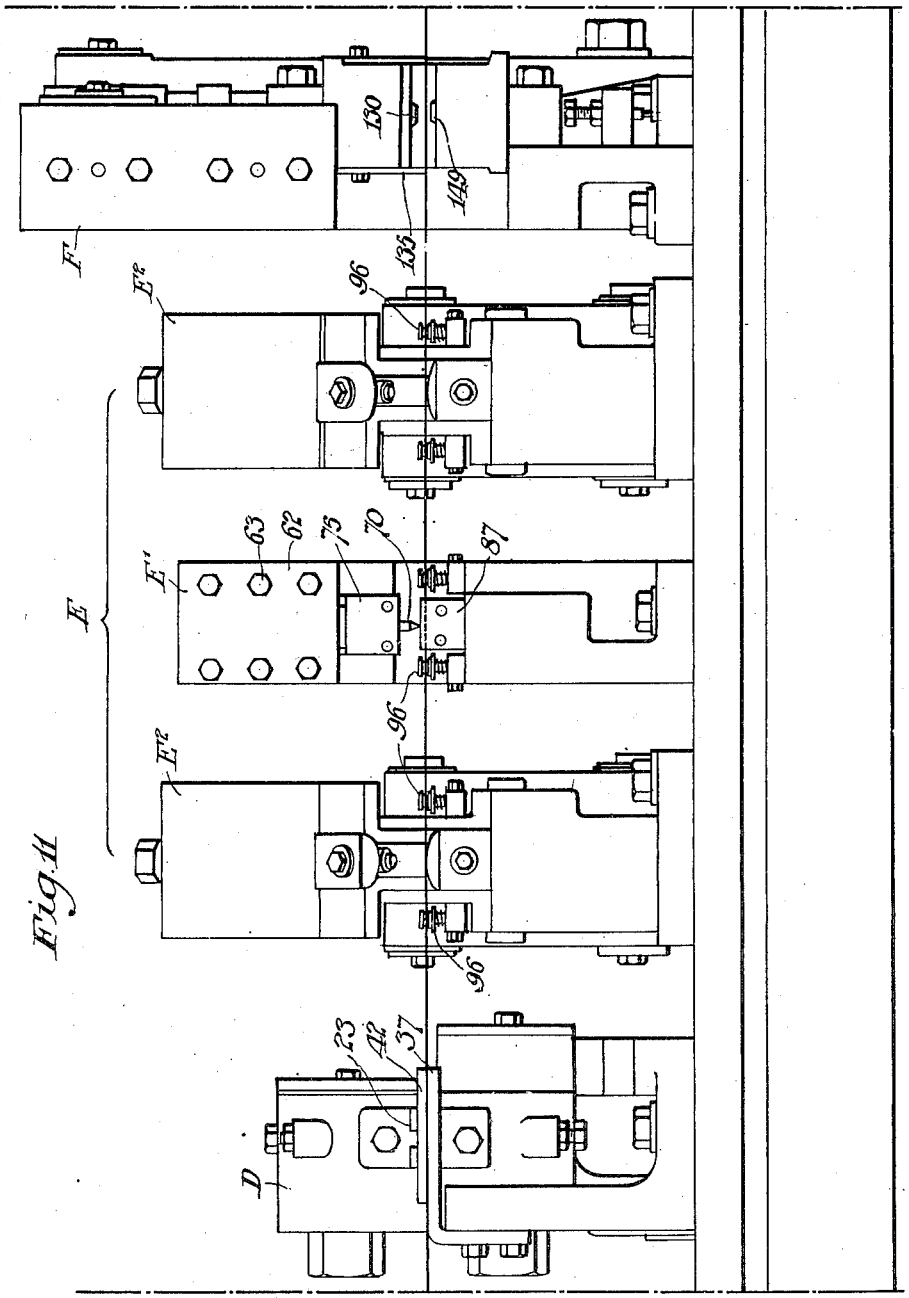

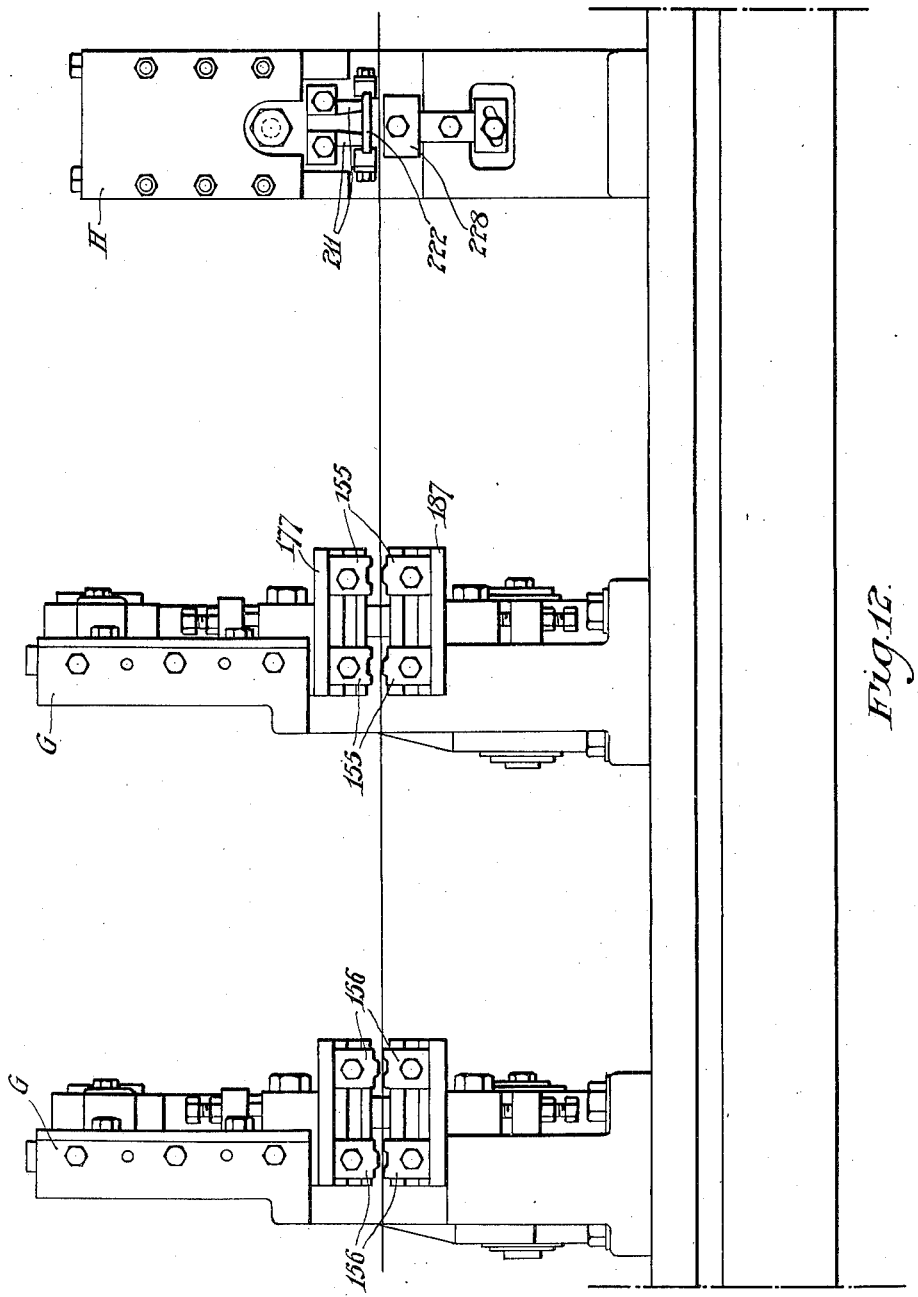

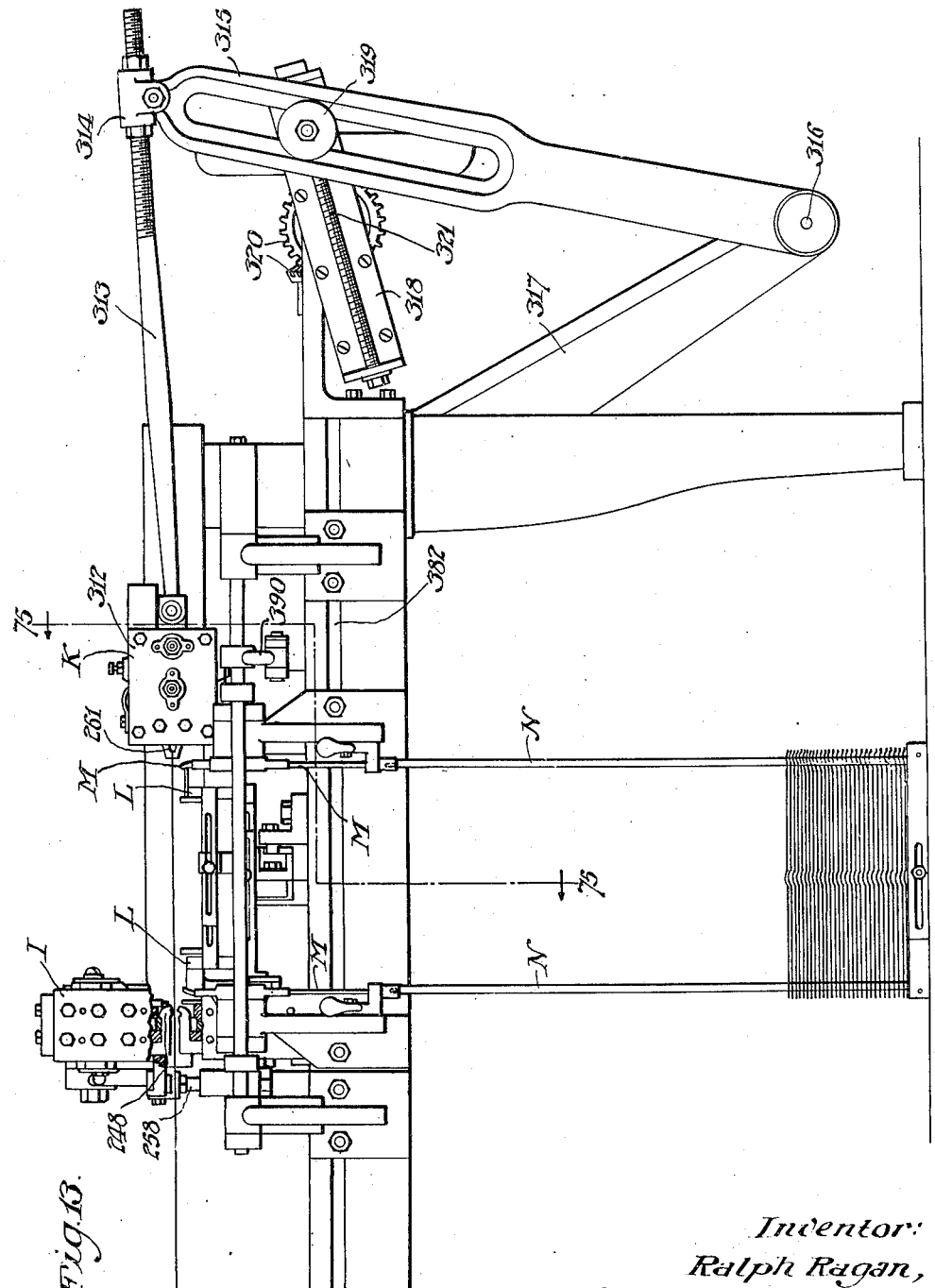

May 26, 1936.   R. RAGAN   2,041,860
HEDDLE AND METHOD OF MAKING THE SAME
Original Filed June 29, 1931   19 Sheets-Sheet 6
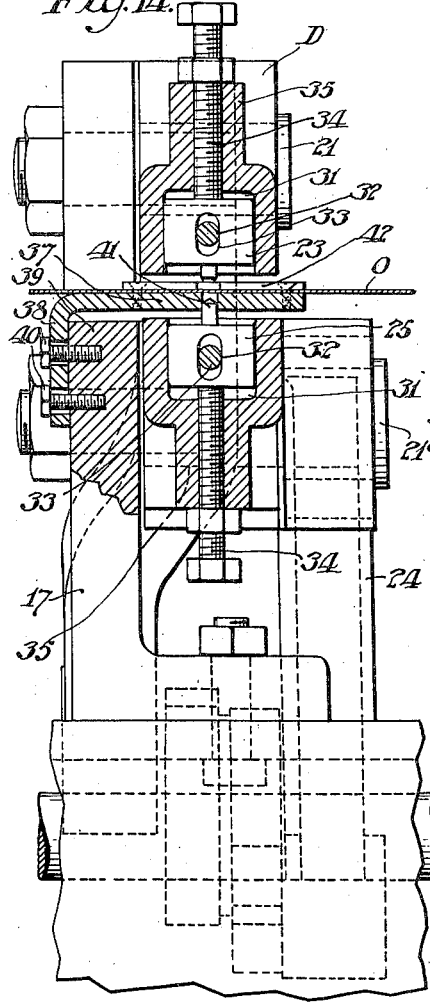
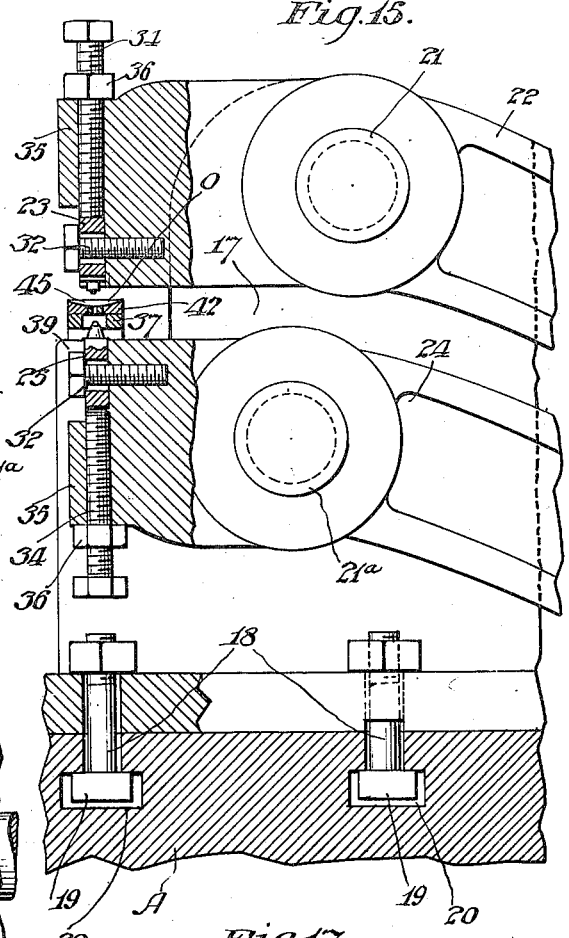
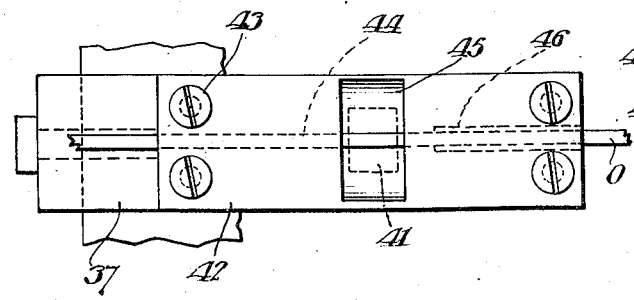
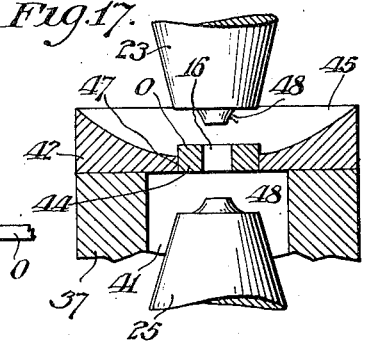
Inventor:
Ralph Ragan,
By Jas. C. Nobensmith
Attorney.

Inventor:
Ralph Ragan,
By Jas. C. Wobensmith
Attorney.

May 26, 1936. R. RAGAN 2,041,860
HEDDLE AND METHOD OF MAKING THE SAME
Original Filed June 29, 1931 19 Sheets-Sheet 8

Inventor:
Ralph Ragan,
By Jas. C. Hobensmith
Attorney.

May 26, 1936.  R. RAGAN  2,041,860
HEDDLE AND METHOD OF MAKING THE SAME
Original Filed June 29, 1931  19 Sheets-Sheet 9

Inventor:
Ralph Ragan,
By Jas. C. Nobensmith
Attorney.

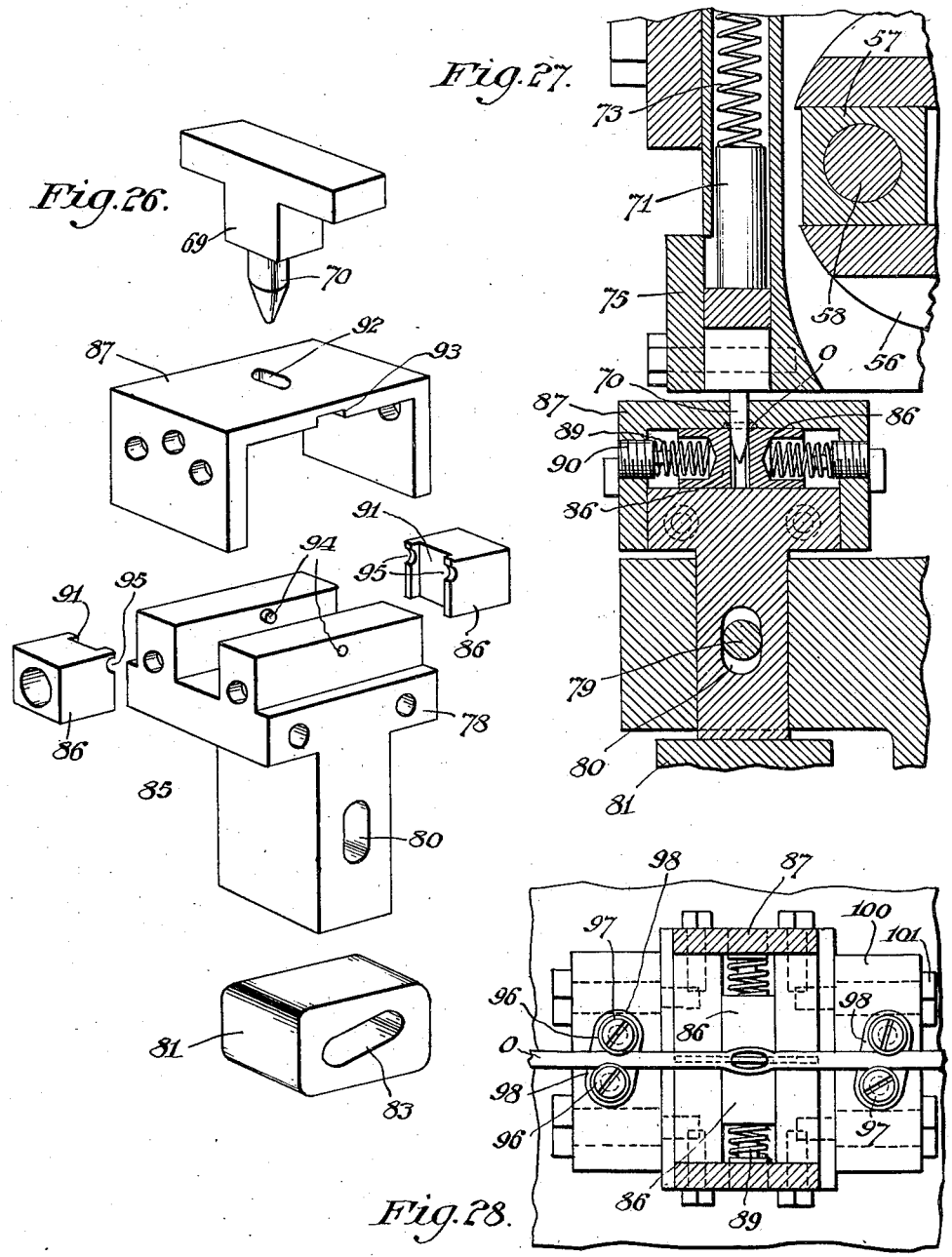

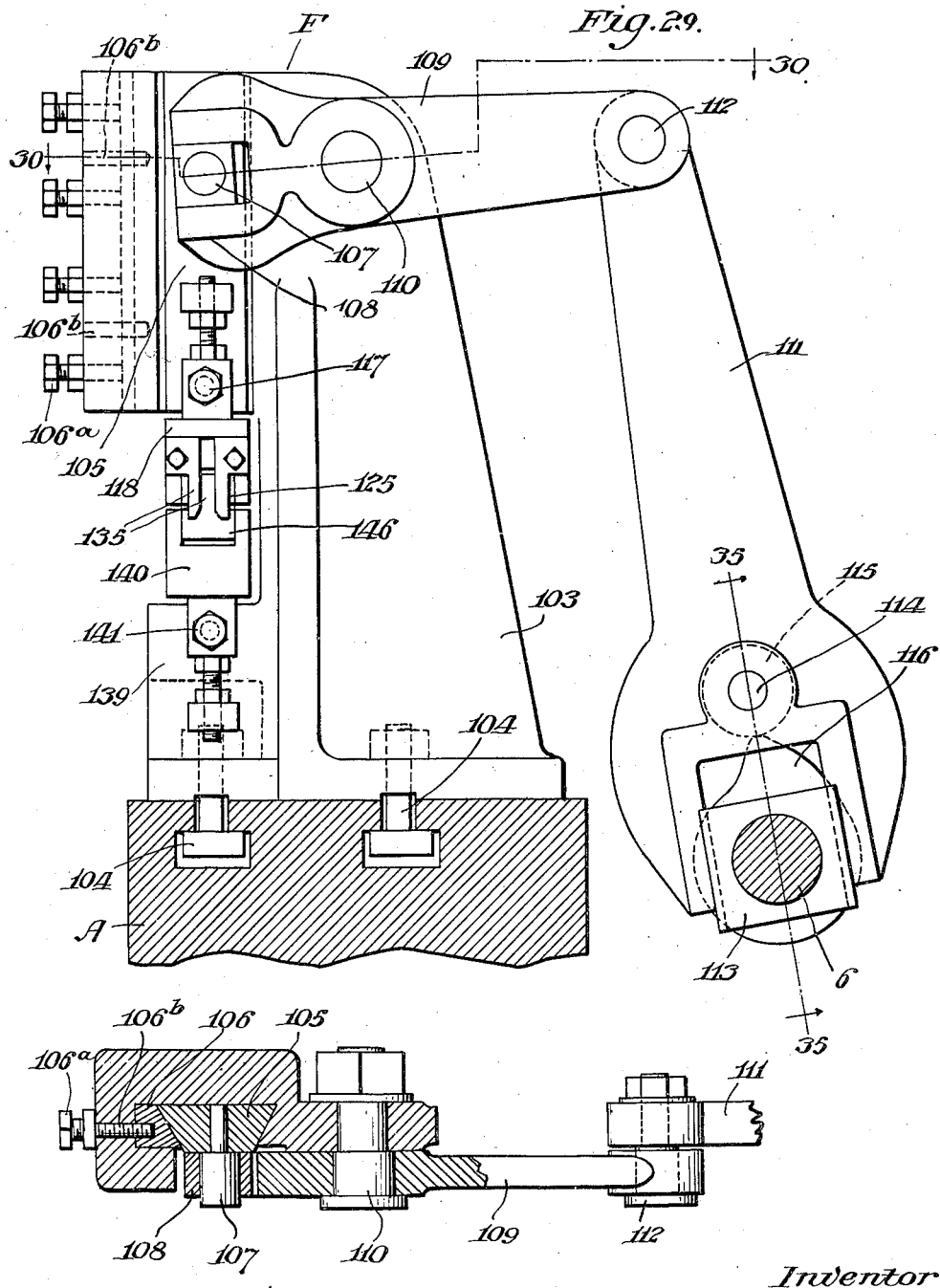

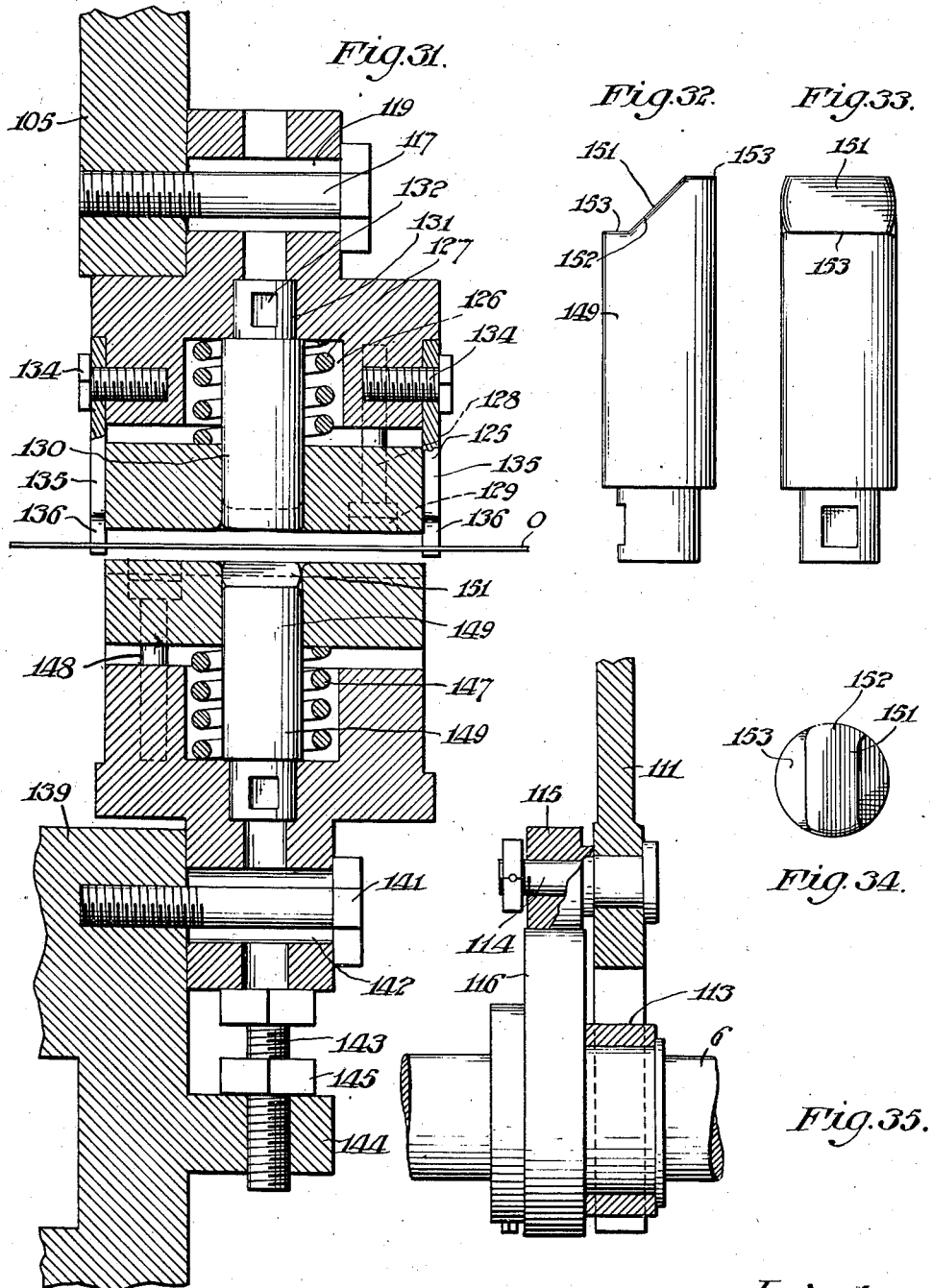

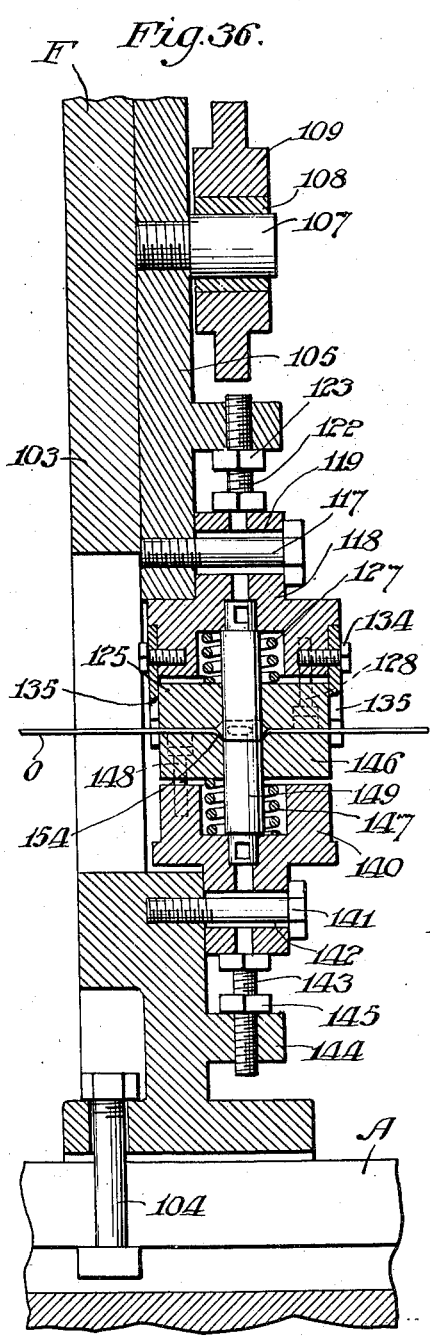
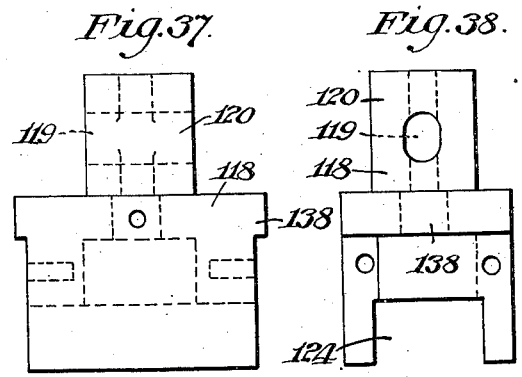
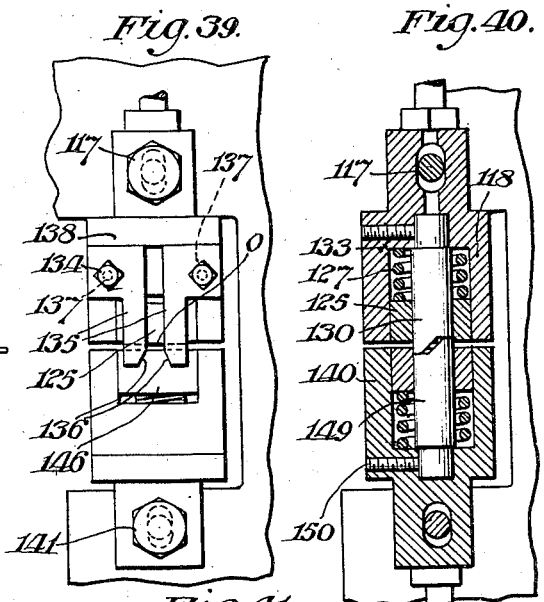
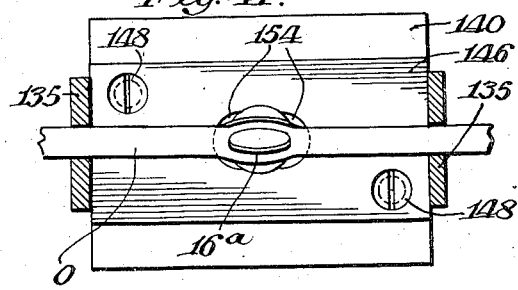

May 26, 1936.　　　　R. RAGAN　　　　2,041,860
HEDDLE AND METHOD OF MAKING THE SAME
Original Filed June 29, 1931　　19 Sheets—Sheet 14
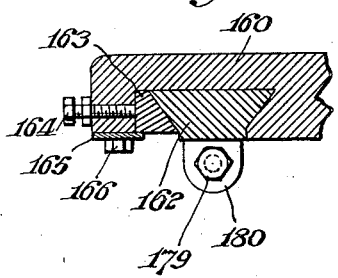
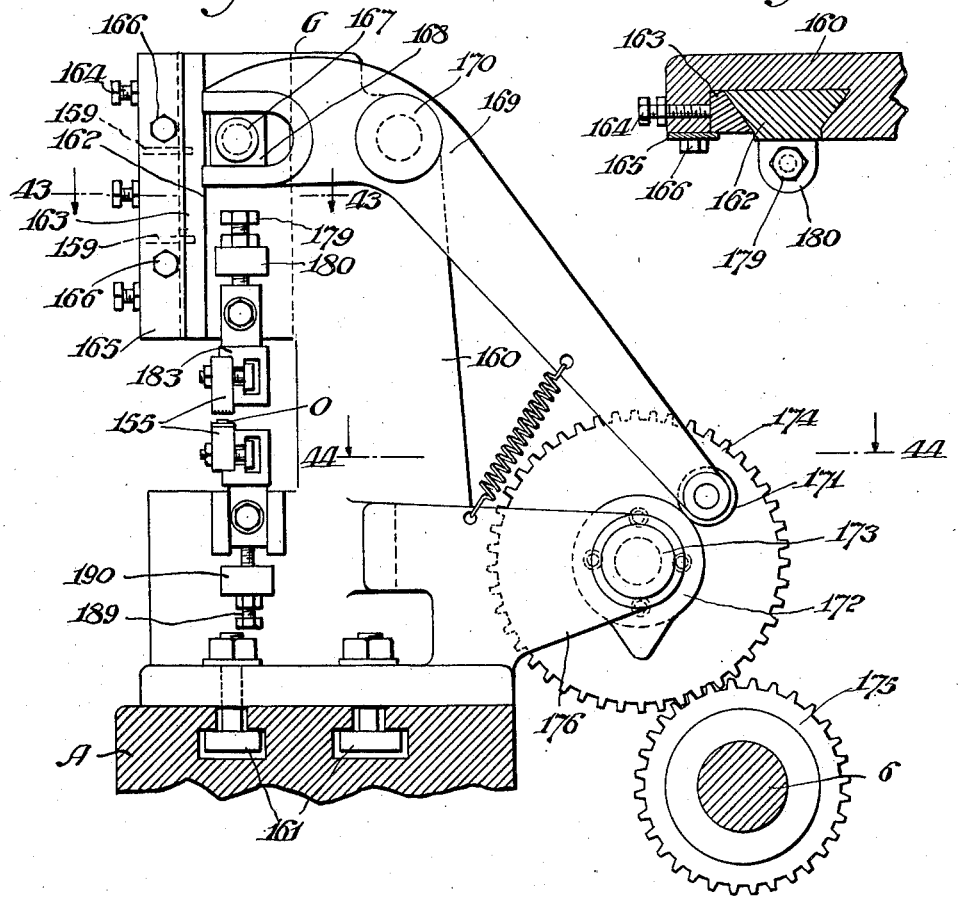
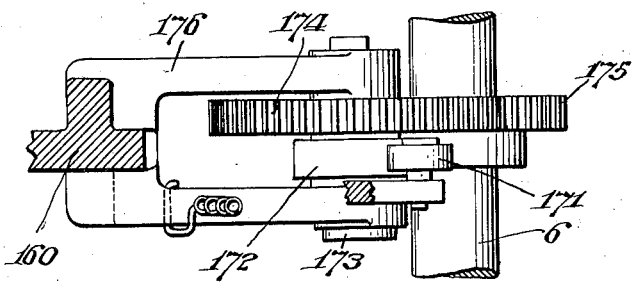
Inventor:
Ralph Ragan,
By Jas. C. Hobensmith
Attorney.

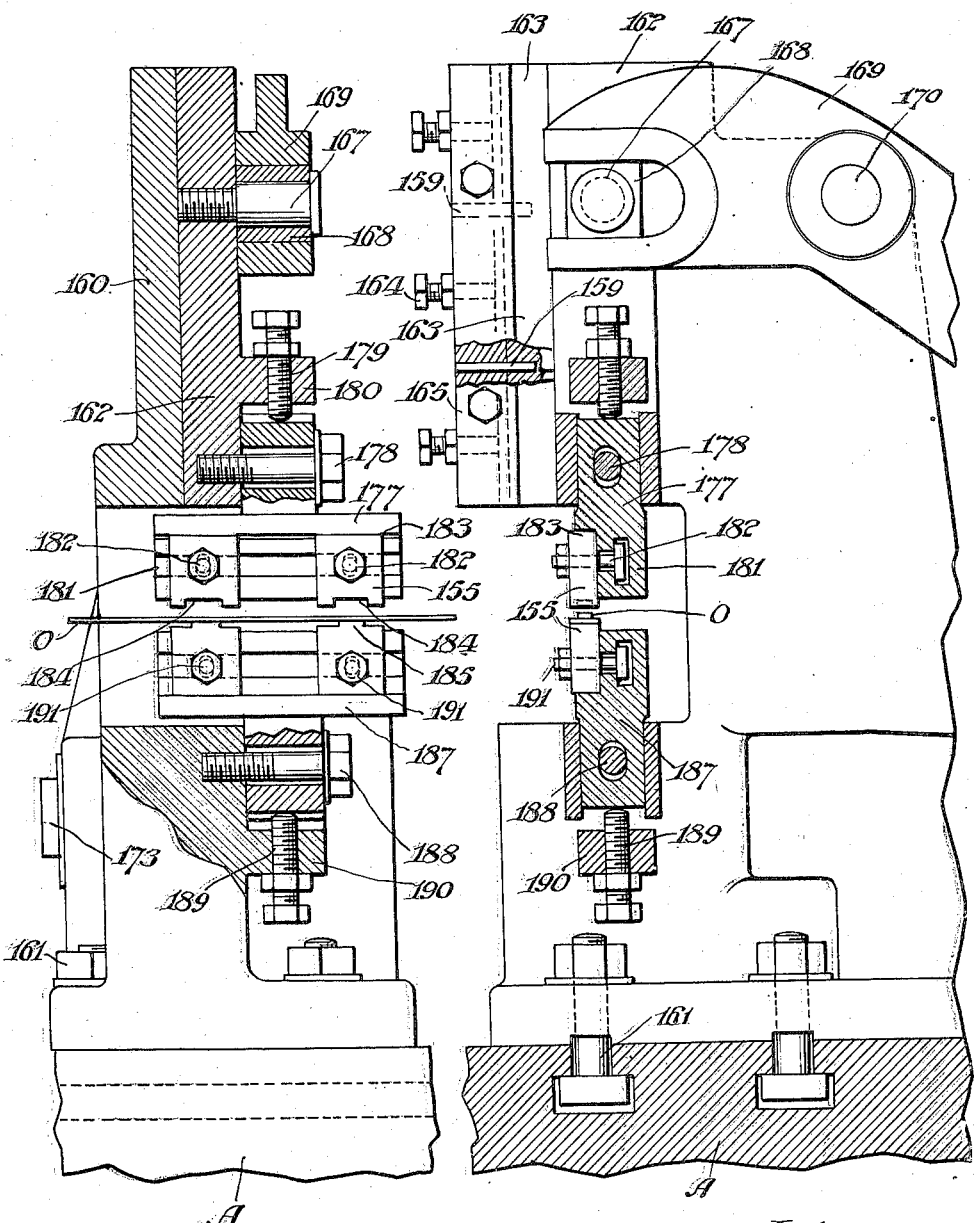

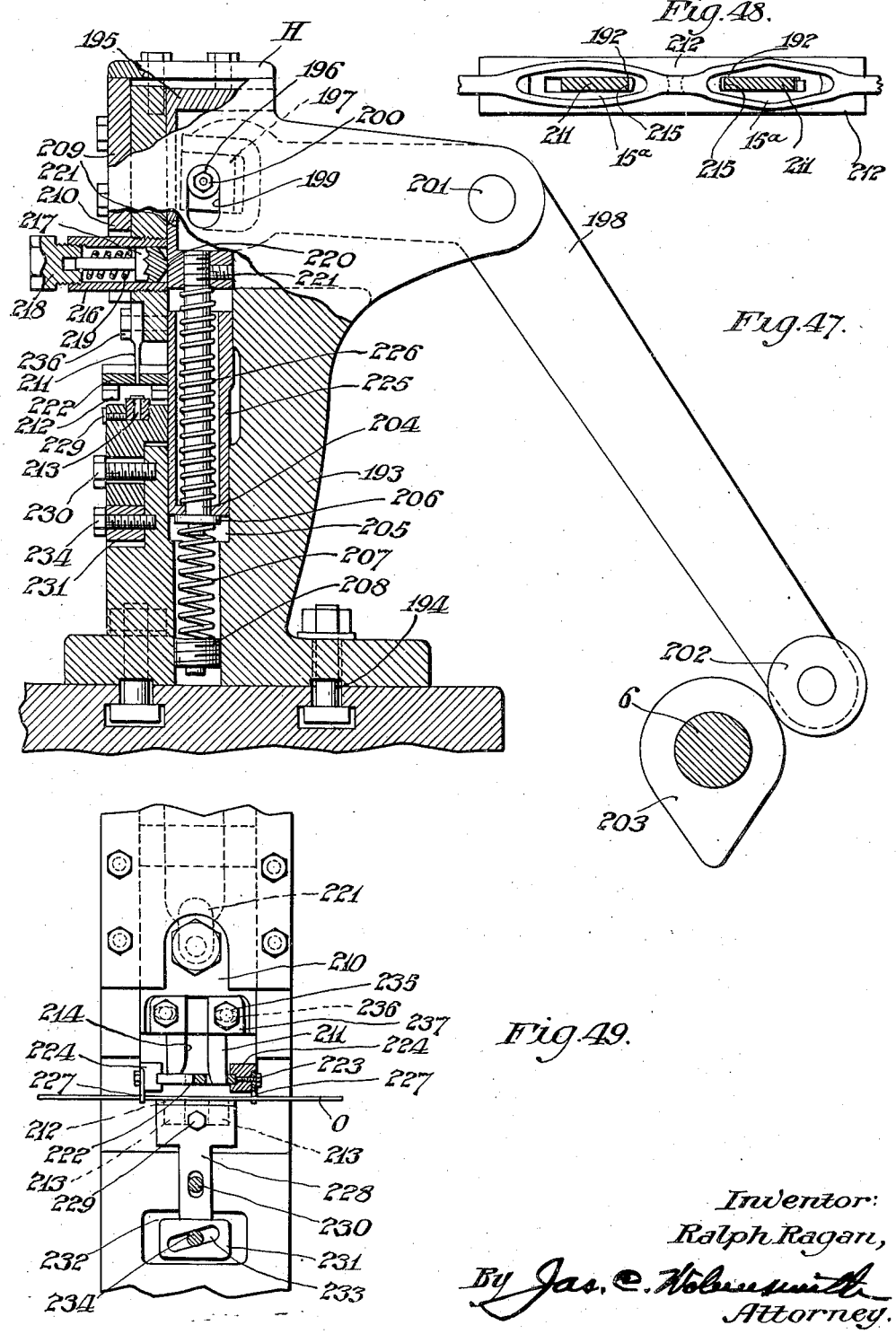

Inventor:
Ralph Ragan,
By Jos. C. Wobensmith
Attorney.

May 26, 1936.  R. RAGAN  2,041,860
HEDDLE AND METHOD OF MAKING THE SAME
Original Filed June 29, 1931  19 Sheets-Sheet 19
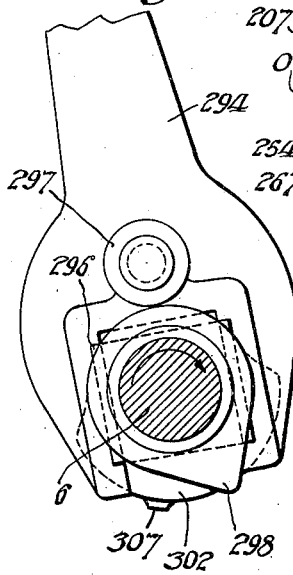
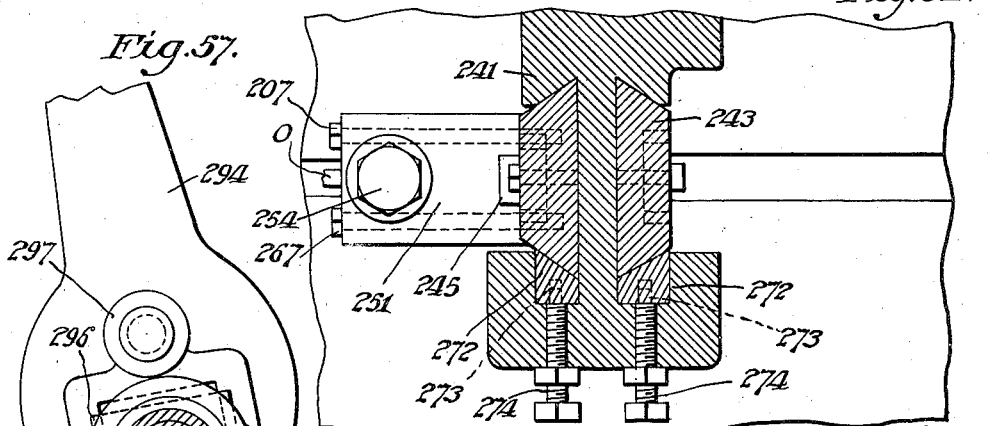
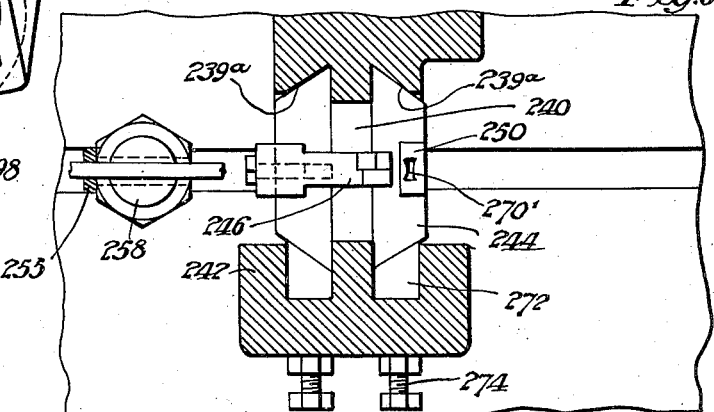
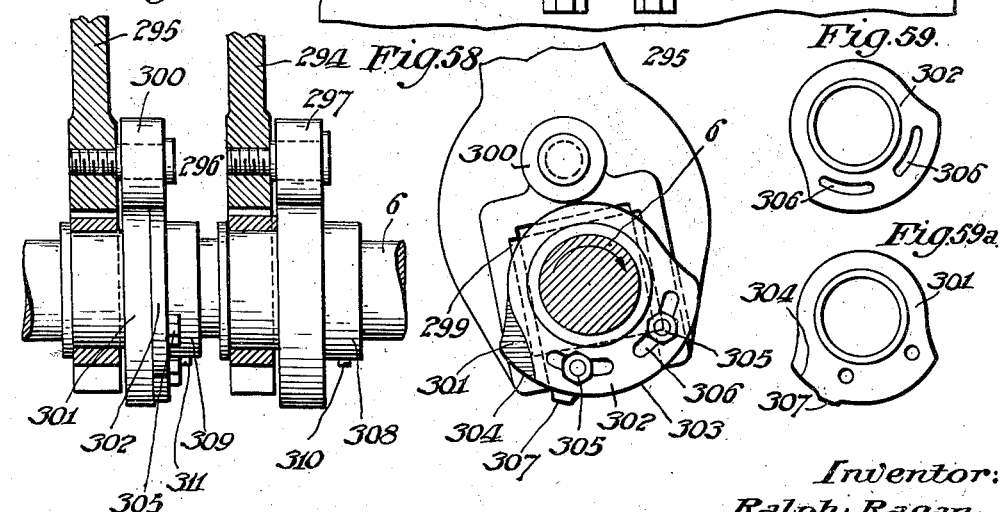
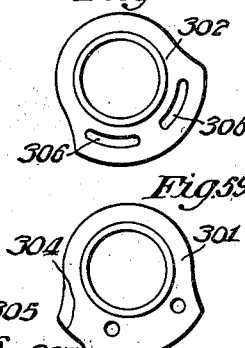
Inventor:
Ralph Ragan,
By Jas. C. Webermuth
Attorney.

Patented May 26, 1936

2,041,860

UNITED STATES PATENT OFFICE 2,041,860

HEDDLE AND METHOD OF MAKING THE SAME

Ralph Ragan, Atlanta, Ga., assignor to Steel Heddle Manufacturing Company, Philadelphia, Pa., a corporation of Pennsylvania Original application June 29, 1931, Serial No. 547,773, now Patent No. 1,948,129, dated February 20, 1934. Divided and this application July 17, 1933, Serial No. 680,855

16 Claims. (Cl. 29—170)

This invention is directed to steel heddles to be utilized in looms for the production of woven materials, and to a method of making the same. Such heddles, when in operation in a loom, are mounted one alongside another in a vertical position in a heddle frame. The latter is provided with rods adjacent its upper and lower edges on which the heddles are strung. The rods pass through eyes formed in the heddles near the ends of the latter and which are termed "rod eyes". The warp threads which go into the formation of the fabric are passed through eyes which occur adjacent the central portions of the heddles, such eyes being known as the "warp eyes" of the heddles.

A preferred form of machine for carrying out the method and for producing the heddles of this invention is shown, described, and claimed in my application for Letters Patent filed June 29, 1931, Serial No. 547,773, issued February 20, 1934, No. 1,948,129, of which application this is a division, although it will of course be understood that various other instrumentalities may, if desired, be employed in the production of such heddles, and in the method of making the same. Certain portions of the machine are fully described herein for the better understanding of the present invention.

In the making of heddles according to my invention, the heddles are formed from a continuous strip of flat steel or other material which, except for the portions thereof that are deformed in the manufacture of the heddle, is of a width and thickness corresponding to the width and thickness of the finished heddles.

This material, at the beginning of the operation, is wound upon a drum or reel. Thence it passes through the mechanisms which are mounted upon the bed plate of the machine, and which perform the various operations for finishing the heddles. These operations include the following, namely,—

First, the punching operation, which punches the holes (three to each heddle), which are to form the rod eye at the end of each heddle and the warp eye at the middle; second, the smooth warp eye operation in which the inner edges of the warp eye are rounded and smoothed; third, the plunge warp eye and swedge rod eyes operation, in which the walls of the warp eye are spread apart, and the metal at the ends of the rod eyes is swedged; fourth, the offset warp eye operation, in which the warp eye and the metal adjacent thereto is twisted to place the warp eye at an angle to the plane occupied by the body of the heddle; fifth, the separator offset forming operation, in which offsets are formed in the body of the heddle adjacent the rod eyes, to properly separate or space the heddles apart when the latter are mounted in a frame; sixth, the radii plunge operation in which the swedged portions of the outer ends of the rod eyes are upset or thickened on a radius equal to the radius of the edges of the rolled heddle rods, so as to fit and bear against the latter across a wide area when the heddles are strung upon such rods; seventh, the upper rod eye crimp and cut-off operation, in which the crimps are placed in the upper rod eye of the heddle, and the heddles cut off.

The wire is drawn through these mechanisms by a metering mechanism which feeds the wire through the machine intermittently a heddle length at a time. From the mechanism which performs the upper rod eye crimp and cut-off operation, the wire is drawn by the metering mechanism to the take-out mechanism. The latter is described in detail in the aforementioned original application. The metering mechanism reciprocates longitudinally with respect to the machine.

One of the objects of my invention has particular reference to the smooth warp eye operation, and is directed to the method of making the warp eye with rounded interior edges so that the warp thread which passes through the eye when the heddle is in operation in a loom, will not engage any sharp edges or corners, and will therefore not be subjected to abrasion, whereby it will be unnecessary to subject the heddle, after its manufacture, to any special operation for smoothing the warp eye of the walls thereof, which has heretofore been the practice.

Another object of my invention is directed to the plunge warp eye operation, during which the walls of the warp eye are separated, so as to accommodate the warp thread when the warp eye is later twisted; and in connection with this object of the invention I provide means whereby the walls of the warp eye are laterally separated or spaced apart without injuring their smoothed interior edges, while being adequately supported from below.

Another object of the invention is directed to the offset warp eye operation in which the eye is twisted with reference to the heddle, and in connection with this object of the invention I provide a method whereby the twisted portion of the heddle merges gradually into the body of the heddle at the upper and lower extremities of the warp eye, and whereby the twisting or setting operation does not cause any bending in the body of the heddle as a whole, but retains the latter in straight condition.

A further object of my invention is directed to the separator offset forming operation, and contemplates the use of separator presses disposed along the path of travel of the wire a distance equal to a heddle length, the separators each being provided with two pairs of dies, one pair of which is adapted to effect offsets in the metal of the wire upwardly, and the other pair adapted to form offsets downwardly in the metal of the wire. The offsets, in each instance, are spaced apart sufficiently to occur inwardly of the rod eyes. Each pair of separator offset dies operates upon two adjacent heddle ends simultaneously, and the separator presses are so timed that the separator dies operate upon alternate lengths of wire corresponding to two heddle lengths. In this manner I form the separator offsets at adjacent ends of three lengths of wire, which will eventualy form separate heddles, simultaneously.

Another object has to do with the radii plunge operation, and is directed to the formation, at the outer ends of the swedged portions of the rod eyes, of upset or thickened portions formed on a radius which equals the radius of the rolled edges of the heddle rods on which the heddles are to be strung. I thereby form bearing surfaces which bear against the edges of the rods along wide areas. Heretofore, it has been customary to form the upset or thickened bearing surfaces on a radius which is less than the radius of the rod edges, and as a result the heddles, when mounted on such rods, engage the latter at points of contact, rather than across a wide bearing surface.

Another general object of the invention is directed to the formation of the upper rod eye crimp and the cut-off operation, and in connection with this object, my invention contemplates the provision of means whereby the wire is first clamped, the crimped dies are then brought together to form the crimp, and then separated while the wire is still clamped, and the cut-off dies are then brought together and then separated, thereby severing the preceding heddle from the length of wire, the wire still being clamped, the wire clamp thereafter releasing the wire. By reason of this arrangement, the metering mechanism, which intermittently draws the wire a heddle length at a time through the machine, may engage the free end of the wire which embodies a completed heddle (before its severance from the remainder of the wire), and may draw the wire out thereby to position the completed heddle (after its severance from the remainder of the wire) to be engaged by the take-out mechanism.

With the foregoing general objects of the invention in mind, and others which will more fully appear as the description proceeds, reference is made to the accompanying drawings in which a preferred form of machine, for carrying out the method of my invention, is illustrated, the heddles being shown in the successive operations resulting in their formation. In the drawings, Figure 1 is a diagrammatic elevational view of the machine;

Fig. 2 is an enlarged elevational view of a portion of the machine illustrated in Fig. 1, including the wire feed mechanism and loop guide;

Figs. 3 to 10, inclusive, are views, some in plan, and some in enlarged section, of a section of wire showing the various steps in the process of making a heddle;

Fig. 11 is an enlarged elevational view of a section of the machine shown in Fig. 1, comprising the smooth eye press, the plunge warp eye and swedge rod eye assembly, and the offset warp eye mechanism;

Fig. 12 is a similar view of another section of the machine, comprising the separator offset forming presses and the radii plunge mechanism;

Figure 18:
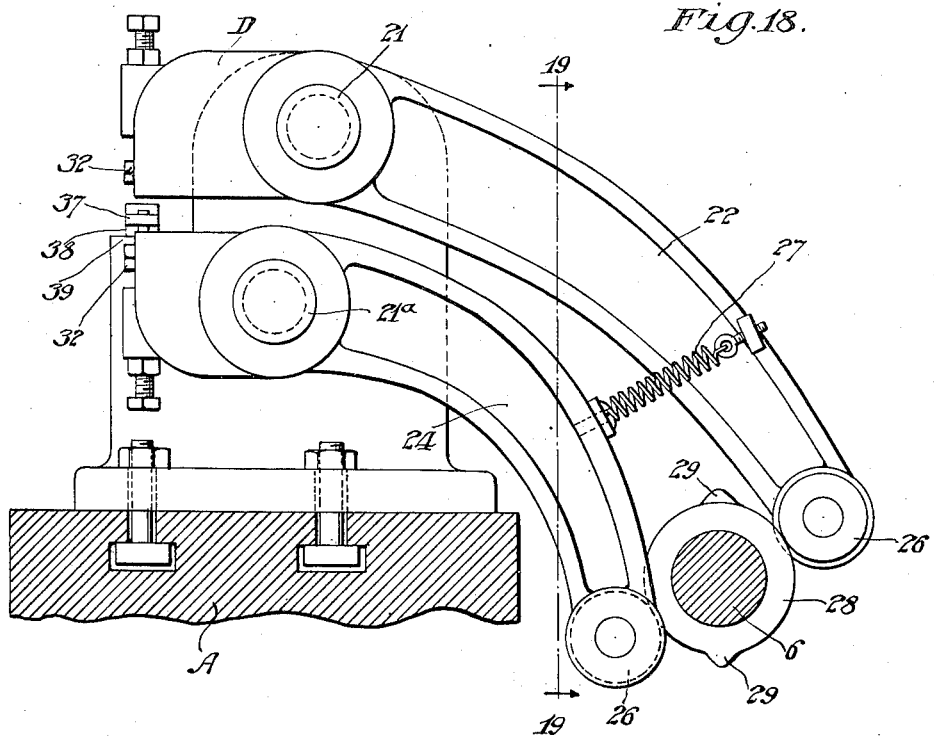
Figure 20:
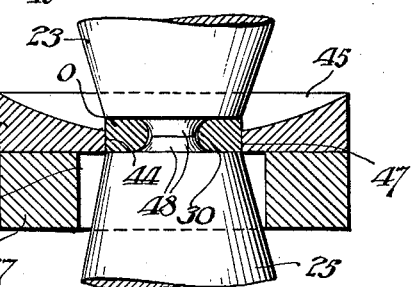
Figure 19:
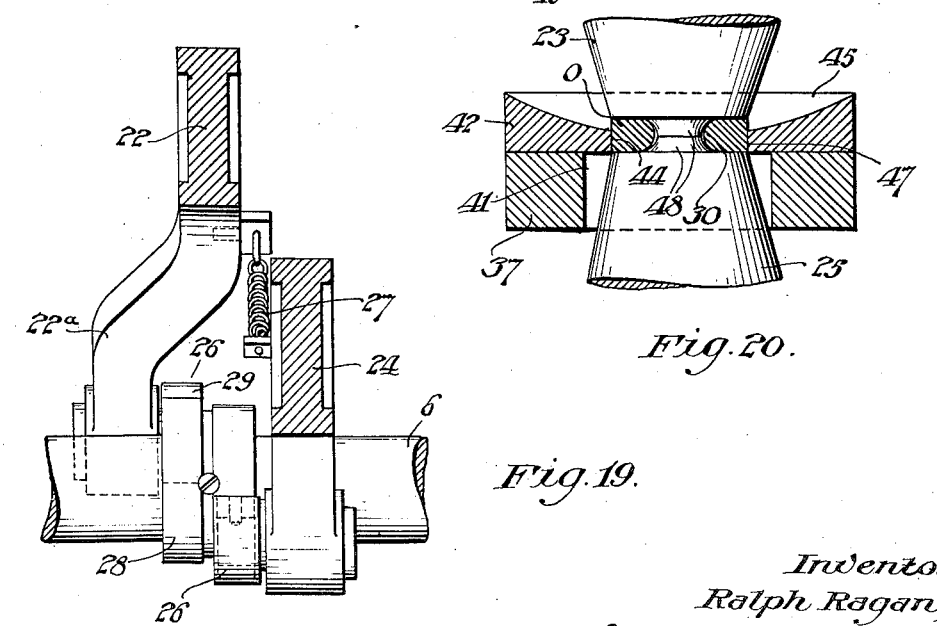
Figure 21:
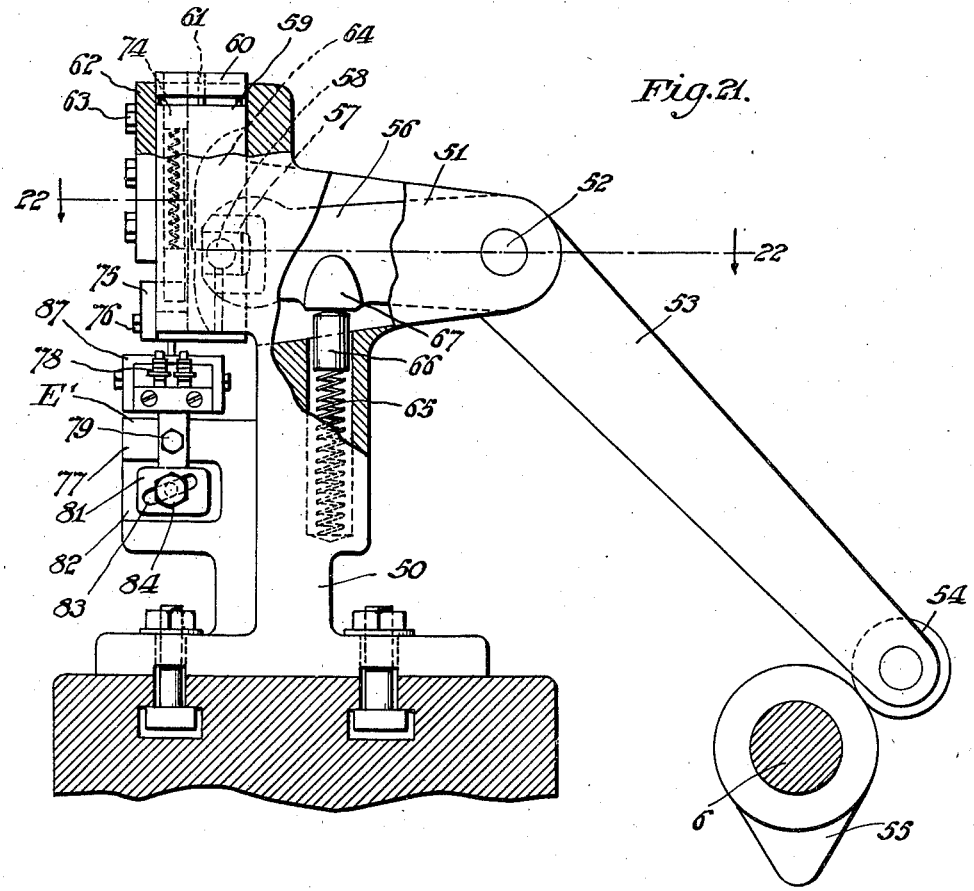
Figure 22:
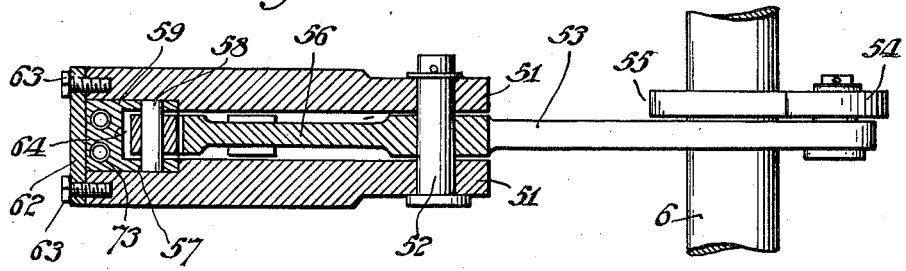
Figure 23:
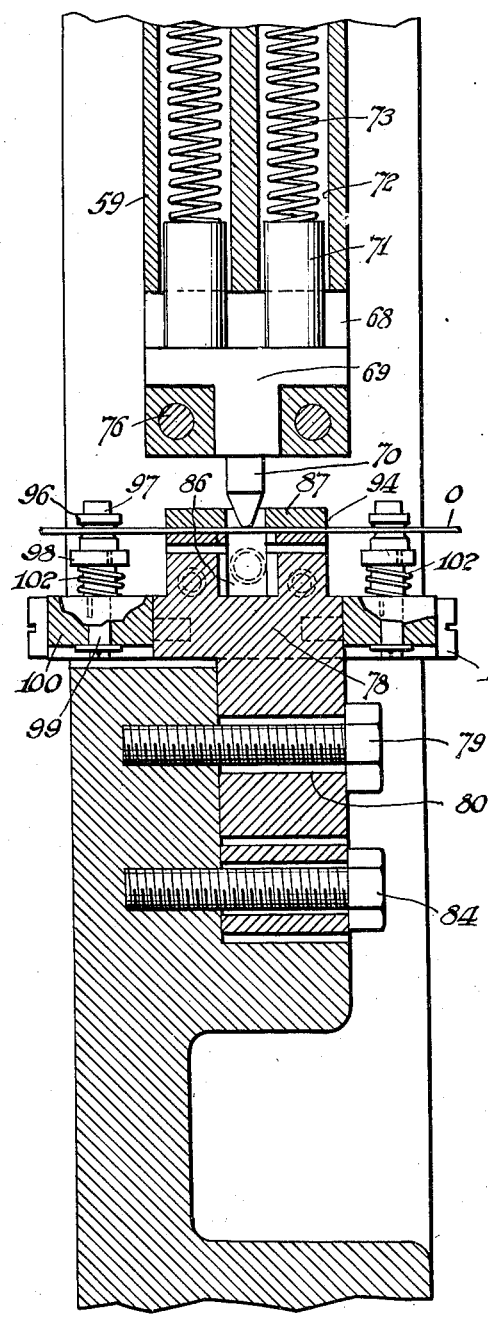
Figure 24:
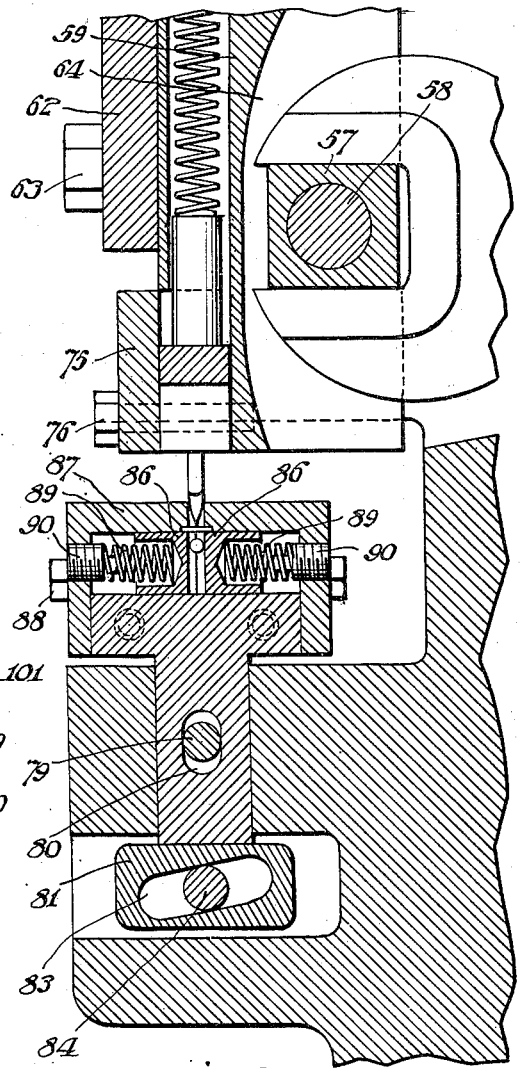
Figure 25:
Figure 50:
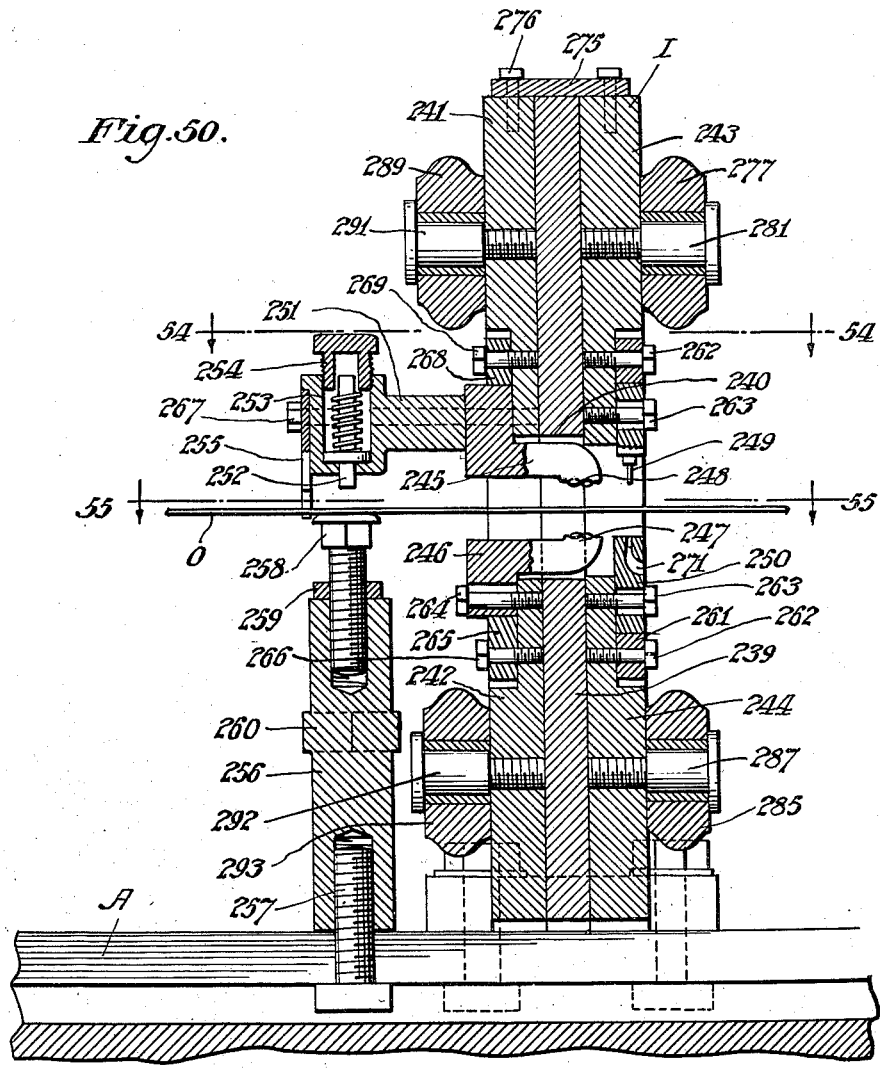
Figure 51:
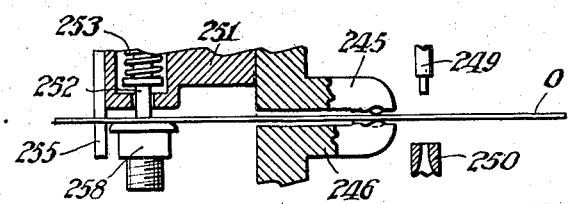
Figure 52:
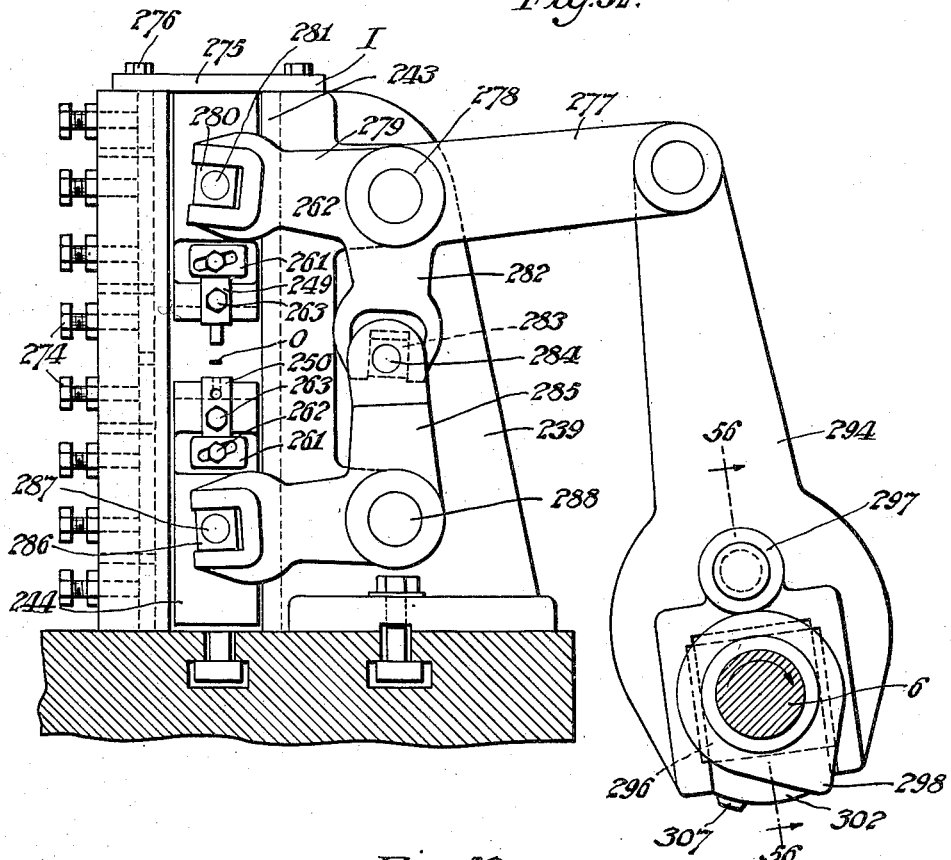
Figure 53:
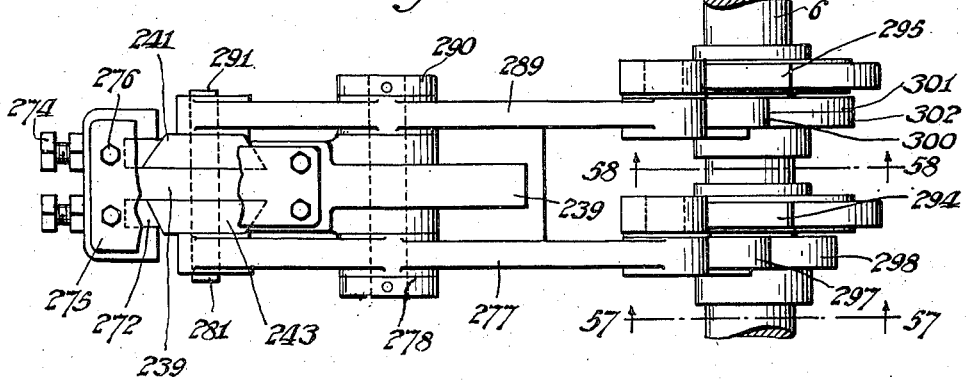

Fig. 13, a similar view on a smaller scale, shows the wire clamp, upper rod eye crimp and cut off assembly, and the metering mechanism, take-out mechanism, transfer rods and receiver;

Fig. 14 is a front elevational view, partially in section, of the smooth eye press;

Fig. 15 is a fragmentary side elevational view, partially in section, of the same;

Fig. 16 is a fragmentary plan view, on an enlarged scale, showing the stripper plate arrangement of the smooth eye press;

Fig. 17 is an enlarged sectional view transversely through the press, showing the dies in open position;

Fig. 18 is a view taken transversely of the bed plate showing the smooth eye press in side elevation;

Fig. 19 is a sectional view on the line 19—19 of Fig. 18;

Fig. 20 is a view similar to Fig. 17, parts being on an exaggerated scale for purposes of illustration, showing the dies in closed position;

Fig. 21 is a side elevational view, partially in section, of the plunge eye mechanism;

Fig. 22 is a sectional view on the line 22—22 of Fig. 21;

Fig. 23 is a vertical sectional view longitudinally of the plunge eye mechanism, on an enlarged scale, the plunge being shown in position before it enters the warp eye;

Fig. 24 is a similar view taken transversely;

Fig. 25 is a fragmentary plan view of the warp eye portion of a heddle after the eye has been spread by the plunge mechanism;

Fig. 26 is a view in perspective, the parts being shown in disassembled condition, of the die assembly of the plunge eye mechanism;

Fig. 27 is a view similar to Fig. 24, on a smaller scale, showing the plunge in position after it has entered the warp eye, and the dies in separated condition;

Fig. 28 is a plan view looking down on the die assembly of the plunge mechanism, the stripper plate being broken away;

Fig. 29 is a view taken transversely of the bed plate of the machine showing the offset warp eye mechanism in side elevation;

Fig. 30 is a section on the line 30—30 of Fig. 29;

Fig. 31 is a fragmentary vertical sectional view, on an enlarged scale, taken longitudinally of the offset warp eye mechanism, the dies being in open position;

Fig. 32 is a view in elevation of the lower offset die;

Fig. 33 is a similar view taken at right angles to Fig. 32;

Fig. 34 is an end view of the lower offset die;

Fig. 35 is a sectional view, partially in elevation, on the line 35—35 of Fig. 29;

Fig. 36 is a view similar to Fig. 31, on a smaller scale, the dies being in closed position;

Fig. 37 is a front elevational view of the upper die holder removed;

Fig. 38 is a side elevational view of the same;

Fig. 39 is a fragmentary side elevational view of a portion of the offset warp eye mechanism;

Fig. 40 is a fragmentary vertical sectional view taken at right angles to Fig. 36;

Fig. 41 is a plan view, looking down on the lower clamp block and die of the offset warp eye mechanism;

Fig. 42 is a view taken transversely of the bed plate showing one of the separator offset forming presses in side elevation;

Fig. 43 is a section on the line 43—43 of Fig. 42;

Fig. 44 is a section on the line 44—44 of Fig. 42;

Fig. 45 is a sectional view, partially in elevation, taken longitudinally of the separator offset press shown in Fig. 42;

Fig. 46 is a similar view taken transversely of the press;

Fig. 47 is a sectional view, partially in elevation, taken transversely of the radii plunge mechanism;

Fig. 48 is a plan view, on an enlarged scale, looking down on the die of the radii plunge mechanism showing adjacent rod eyes in position and being worked on;

Fig. 49 is a fragmentary front elevational view, partially in section, of the radii plunge mechanism;

Fig. 50 is a sectional view, taken longitudinally, of the wire clamp, upper rod eye crimp, and cut off assembly, the mechanism being in open position;

Fig. 51 is a similar fragmentary view, the wire clamp having engaged the wire, and the dies being about to crimp the eye;

Fig. 52 is a view transversely of the bed plate showing the wire clamp, upper rod eye crimp and cut off mechanism in side elevation;

Fig. 53 is a plan view of Fig. 52, partially broken away;

Figs. 54 and 55 are horizontal sectional views, on an enlarged scale, on the lines 54—54 and 55—55, respectively, of Fig. 50;

Fig. 56 is a sectional view on the line 56—56 of Fig. 52;

Fig. 57 is a fragmentary sectional view on the line 57—57 of Fig. 53;

Fig. 58 is a similar view on the line 58—58 of Fig. 53;

Fig. 59 is a view in elevation of the crimp cam quadrant removed; and

Fig. 59a is a similar view of the crimp cam.

General assembly

The machine is assembled upon a bed plate A, supported by legs 5, the various instrumentalities being driven from a cam shaft 6 which is driven through suitable gearing 7 by a motor 8. Beyond one end of the machine is arranged a reel B, on which the wire from which the heddles are to be made is wound. From the reel the wire passes through a feed mechanism 9, forms a loop as at 10 and passes over a loop guide 11, and thence through an adjustable wire guide 12 which alines the wire with the instrumentalities which are to operate upon it, and which are mounted on the bed plate of the machine.

These instrumentalities include the punch press C, which punches the wire so as initially to form the rod eyes adjacent the ends of the heddle and the warp eye which occurs at the intermediate portion; a smooth eye press D, which performs the second step in the formation of a heddle and which displaces the metal around the interior walls of the warp eye to form smooth rounded walls without any burr, between which the warp thread may subsequently pass when the heddle is in operation without danger of encountering any sharp corners or edges; the assembly E for plunging the warp eye to separate the walls of the latter and swedge the rod eyes (such assembly including the plunge mechanism E' and the two swedging mechanisms $E^2$, which flank the plunge mechanism); the offset warp eye mechanism F, which twists the warp eye with reference to the body of the heddle; the separator offset forming presses G, which form the offsets in the bodies of the heddles to maintain them properly spaced when assembled in a frame; the radii plunge mechanism H, which upsets the outer swedged ends of the rod eyes on a radius corresponding to that of the rolled edges of the rods on which they are to be assembled in a frame; the wire clamp, upper rod eye crimp, and cut-off assembly I, which crimps the upper rod eyes and severs the preceding finished heddle, while maintaining the wire clamped; the metering mechanism K, which intermittently draws the wire through the machine; the take-out mechanism L, which takes the finished heddles laterally out of the line of work; and the transfer rods M, which receive the heddles from the take-out mechanism L, and guide them onto the receiver. The latter is indicated generally at N, and is mounted on the floor with the upper ends of the receiver rods detachably extending into sockets in the lower ends of the transfer rods M.

The various mechanisms are adjustable longitudinally of the bed plate of the machine, the latter being provided with T-shaped slots which receive the heads of bolts carried by the mechanisms, which bolts may be loosened when desired and the mechanisms adjusted toward or away from each other to assume the precise positions with reference to each other, and the distances apart, that may be required in making a heddle of a given length. The various dies and punches carried by the different mechanisms are also adjustable, so that the machine is thus capable of making heddles of different lengths and widths and of being properly and precisely adjusted for this purpose.

The wire, which is converted into heddles as it passes through the machine, is indicated at O.

First operation—Punching heddle rod eyes and warp eye

From the wire guide 12, the wire passes through the punch press C, where the end punches 13 and the center punch 14 punch the openings 15 and the opening 16 (see Fig. 3), which are to be formed into the rod eyes and the warp eye, respectively, of the finished heddle. The punch press is known in the art. It is operated from the cam shaft through suitable connections, which may be of any preferred type, and are, therefore, not illustrated. The openings 15 punched in the metal strip are of substantially the length of the finished rod eyes $15^a$, and the opening 16 substantially the length of the finished warp eye $16^a$. These openings are, however, of relatively narrow width, so as to leave enough metal at the sides of the openings to form the walls of the rod eyes and warp eye, respectively, of sufficient strength.

Second operation—Smoothing the warp eye

Arranged on the bed plate of the machine, at such distance that its dies are substantially two heddle lengths from the center punch 14 of the punch press, is the smooth eye press D, which performs the second step in the formation of the heddle, and which acts on the warp eye only.

This press is illustrated in Figs. 14 to 20, inclusive.

It includes an angle plate or casting 17, held to the bed plate A, by means of bolts 18, the heads 19 of which extend into the T-shaped slots 20 provided in the bed plate, thereby to secure the angle plate in fixed adjusted position longitudinally of the bed plate. Pivoted at 21, to the casting, is an upper lever 22 on the nose of which is secured the upper press die 23. A lower lever 24 is pivoted on the casting on a shaft 21ᵃ, and has an arm which is offset from the arm of the upper lever. On the nose of the lower lever, in vertical alinement with the upper die 23, is mounted a lower die 25, which is a counterpart of the upper die, but reversed in position with respect thereto.

The outer end of the upper lever 22 is offset as at 22ᵃ, and at the outer ends of the upper and lower levers are carried rollers 26 which, by means of a spring 27 connecting the levers, are maintained constantly against a cam 28 carried on the cam shaft 6. The cam is provided with a pair of lobes 29, diametrically opposed, and offset with respect to each other so that, as the shaft revolves, one lobe engages the roller of one lever while the other engages the roller of the other lever. Due to the fact that the cam lobes are diametrically opposed, the levers are actuated simultaneously so as to bring the dies together simultaneously and at the same rate of speed. Due to the offset relationship of the rollers and the cam lobes, the levers are actuated, however, only once for each revolution of the cam shaft.

The dies 23 and 25 are disposed in recesses 31—31 provided in the ends of the upper and lower levers, respectively, which recesses are of somewhat greater length than the vertical height of the dies, so as to allow the adjustment of the latter toward and away from each other. The dies are maintained in adjusted position by headed horizontally extending screws 32—32, which extend through elongated slots 33—33 provided in the bodies of the respective dies, which enter screw-threaded openings in the ends or noses of the levers, and by vertically extending screws 34—34 which are threaded through bosses 35—35 formed on the lever ends, which screws engage the bases of the respective dies. These screws may be locked in adjusted position by the lock nuts 36—36.

A lower stripper plate 37, over which the wire O passes, has an angularly bent extension 38, which extends over a shouldered portion 39 of the angle plate or casting 17, and is secured thereto by screws 40, which pass through elongated slots in the angle plate extension, thus to mount the stripper plate in a vertically adjustable position on the casting. The lower stripper plate has an opening 41 through which the lower die may pass to reach the wire. An upper stripper plate 42 is mounted on the lower stripper plate through the medium of screws 43, and is provided in its lower face with a longitudinally extending slot 44 through which the wire O slidably extends. The upper stripper plate is transversely milled to provide a recess 45, such recessed portion being cut in an arc intersecting with the slot 44, thereby to expose a length of the wire to the action of the upper die as the latter descends into the recess. This recess is arranged above the opening 41 in the lower stripper plate, so that while the exposed portion of the wire is acted upon on its lower surface by the lower die, at the same time its upper surface is being acted upon by the upper die. The slot 44 is of a width and depth corresponding substantially to the width and thickness of the wire strip. At one end, beyond the recess 45, the slot is increased somewhat in width as at 46, to overcome any tendency which the stripper plate might otherwise have to bind the wire as it passes therethrough.

Where the bottom of the recess 45 intersects the slot 44, walls 47 are formed, which bear against the lateral edges of the wire, and hold them against spreading when the dies come together. Such walls are of a vertical width or depth slightly less than the thickness of the wire, so as not to form any obstruction to the action of the dies, while at the same time adequately supporting the wire against spreading, (see Figs. 17 and 20). The dies are tapered toward their working ends, and at such ends are provided with sector shaped working faces or recesses 48—48, respectively, the radius of curvature of each of which is slightly greater than half the thickness of the wire, as indicated by the arrow in Fig. 17, and therefore slightly greater than the radius of curvature to be given the inside face of the warp thread eye. In Fig. 17, the wire is shown in position, the dies being separated, and the opening cut in the metal strip by the center punch of the punch press, for the warp eye, is indicated at 16. It will be noted that the shoulders around the edges of the opening 16 are square.

In Fig. 20, the dies are illustrated in their closed positions, and it will be noted that the inner edges of the opening for the warp eye have been rounded as at 30. This is accomplished by deforming the right angular shoulders and forcing the metal inwardly toward the central horizontal plane of the wire, thus rounding these edges and making them perfectly smooth and also strengthening the side walls of the warp eye throughout. Since the radius of the sector shaped recesses of the dies is greater than the radius of the rounded edge to be given to the eye, the metal as it is displaced does not quite reach the surfaces of the recesses where the faces of the dies come together, and hence no fin or burr is formed on the rounded edges of the eye. At the same time, the edges of the eye are rendered perfectly smooth and rounded.

It is therefore unnecessary to send the heddles, when they are completely formed by the operations to be hereinafter described, and are delivered from the machine, through any further processes or operations to smooth the edges of the warp eye. In the past, in the manufacture of steel heddles, it has been customary to send the heddles, after they have been delivered from the machine, through a special process for smoothing out the edges of the warp eyes. The method which I use for effecting it, eliminates this additional step and the costs and delays incident thereto. The length and the width of the extreme working ends of the dies, as defined by the sector shaped working faces 48, are slightly less than the length and the width, respectively, of the opening 16 punched in the metal strip by the punch press.

It should be understood that as the wire is drawn through the machine intermittently, a heddle length at a time, the warp eye openings of one heddle after another will be positioned in alinement with the dies, whereupon the jaws will be actuated under the influence of the cam 28, the walls of the eye rounded and strengthened in the manner already described, and the jaws opened under the action of the spring 27, whereupon the wire is conditioned to be again drawn through the machine.

*Third operation—Plunging warp eye and swedging rod eyes*

The assembly E, which includes the swedges E², and the intermediate plunge mechanism E', is spaced from the smooth eye press D, so that the operating portion of the plunge eye mechanism E' is substantially a heddle length away from the dies of the smooth eye press D, and the swedges E² are so positioned that when a warp eye registers in the plunge mechanism E', the openings which are to form the rod eyes of the heddle register with the swedging mechanisms of the swedges E².

The swedges E² are known, and therefore it is not necessary to describe them or show how they operate, except to say that they may be actuated from the cam shaft simultaneously with the operation of the plunge mechanism E', and that they spread and swedge the rod eye 15ª of the heddles to place them in the condition shown in Fig. 5, in which the rod eyes have been opened, and the fins 49 formed at the opposite ends of each rod eye. The plunge press and its method of operation, and its use in combination with the smooth eye press, are new with me and form part of my invention.

The plunge mechanism E' includes the main casting or base 50, having a pair of rearwardly projecting arms 51, between which is pivoted, at 52, the lever 53. The lower end of the lever carries a roller 54 which is actuated by the cam 55 mounted on the cam shaft 6 of the machine. The upper portion 56 of the lever is disposed at an angle to the portion 53 thereof, and at its forward end is formed with jaws which slidably fit upon a block 57 pivotally carried by a pin 58 which is mounted on the slide 59. The slide fits in a vertical slot formed in the base or casting 50, and moves up and down under the action of the lever 53 as the cam shaft rotates.

The slide 59 is provided with an oil groove 60, fed from an oil duct 61, from time to time, when oil is deposited in the latter, so as to lubricate the contacting surfaces of the slide and the casting with reference to which it reciprocates. A plate 62, mounted on the forward face of the base 50, at the upper portion thereof overlies the slide 59 and retains the latter in place in the casting. The plate may be held in place by means of screws 63. The rear edge of the slide is cut out or recessed as at 64, to accommodate the jaw of the lever 53.

A spring 65 mounted in a bore provided in the casting or base 50, presses at its upper end against a plunger 66, which latter bears against a lug 67 formed on the lower edge of the arm 56 of the lever, so as to maintain the lever roller in constant contact with the cam 55.

The lower end of the slide 59 is provided with a recess 68 which accommodates the T-shaped base 69 of the plunge 70. The former is provided with guide lugs 71 which extend into the lower ends of bores 72 provided in the slide 59, (see Figs. 23 and 24), and are engaged by the lower ends of springs 73 located in such bores. The upper ends of the springs bear against the lower ends of adjusting screws 74, which are threaded into the upper ends of the bores 72, (see Fig. 21).

The plunge base 69 is overlain by a plate 75 secured in position on the slide by screws 76, which plate retains the plunge base in position within the recess 68.

The plunge 70 at its lower end tapers gradually to a point, and is of a width corresponding to the inside width to be given to the warp eye 16ª of the finished heddle, and of a length substantially corresponding to the length of such warp eye.

Arranged in a recessed portion of an offset 77 of the main casting or base 50 of the plunge eye mechanism is a die holder 78. This holder is substantially T-shaped, and is retained in position by a screw 79 extending through a vertically elongated slot 80 of the stem of the die holder. The lower end of such stem bears against an adjusting block 81, which is mounted for horizontal movement in a recess 82 in the offset portion 77 of the main casting. Such adjusting block is provided with a diagonally disposed slot 83, through which extends a headed screw 84. By shifting the adjusting block 81 to the right with respect to Fig. 21, the screws 79 and 84 having been loosened, the die holder 78 will be moved vertically, and by shifting the block 81 to the left, the die holder will be lowered vertically. Thus the die holder is adjustable vertically with reference to the plunge 70. When the proper adjustment is secured the screws 79 and 84 are of course tightened to retain the die holder in adjusted position.

The die holder is transversely grooved as at 85 (see Fig. 26), and in such groove are arranged the dies 86—86. The latter are retained in position by a stripper plate 87 which overlies the upper end of the die holder 78 and is secured to the latter by screws 88 which extend through the down-turned ends of the stripper plate into the die-holder, springs 89 being interposed between the dies (which are recessed to receive the inner ends of the springs) and the adjusting screws 90 which are threaded through openings in the overturned ends of the stripper plate and bear against the outer ends of the springs.

The dies 86—86 are thus forced toward each other by the springs 89. At their inner ends they are provided, respectively, with vertically arranged recesses 91—91, adapted to accommodate the plunge 70 when the latter projects downwardly through the opening 92 provided in the stripper plate 87. The latter, on its under side, is slotted as at 93, to receive the wire strip, the slot being of a sufficient width to accommodate the warp eye when the side walls of the latter are spread by the plunge 70. The plunge 70 and the opening 92 in the stripper plate are so positioned that the strip, as it is fed forwardly, intermittently stops with the warp eye, the inner ends of which have been previously rounded as has been heretofore described, in registration with the opening 92 of the stripper plate, and of course in registration with the plunge 70, the wire strip being accommodated in the slot 93 on the under side of the stripper plate. As the plunge descends, when the slide 59 is driven downwardly under the influence of the cam acting on the roller of the lever 53, the plunge enters the warp eye, and spreads the side walls of the latter, as indicated in Fig. 25, without, however, disturbing the contour of the rounded inner edges of the warp eye.

The dies 86—86, into the recesses 91—91 of which the plunge enters as it is lowered, move transversely to accommodate the plunge, at the same time supporting from beneath the metal forming the side walls of the warp eye, so that the action of the plunge is confined to a spreading movement of the walls of the eye, and does not distort or bend the side walls of the warp eye downwardly.

In order to center the dies 86—86 properly, the die holder 78 is provided with pins 94 intermediate its lateral edges, (Fig. 26), which pins serve as centering pins for the dies 86—86, the adjacent edges of the latter being provided with recesses 95—95, which encompass the pins when the inner edges of the dies are in abutting relationship.

Mounted upon the offset 77 of the main casting 50, on each side, longitudinally of the machine, of the die holder 78, are wire guides which maintain the wire properly centered. Each of these guides includes a pair of grooved rollers 96 rotatably mounted by pins 97 on a plate 98, which latter is in turn pivotally mounted by a downwardly extending stem 99 on a block 100, the latter being retained by screws 101 against the ends of the die holder 78. Springs 102, anchored at their lower ends in the block 100, and at their upper ends in the plate 98, tend to retain such plates at an angle to the length of the wire strip, and hence maintain the rollers 96 against the lateral edges of the wire O (see Fig. 28). The wire is thus maintained centered, any increases or decreases in the width of the wire being compensated for by a turning movement of the plate 98 toward positions more nearly or less nearly at right angles to the travel of the wire, and hence under the influence of the rollers, maintaining the wire properly centered, irrespective of changes in the width of the latter.

It will be understood that the plunge 70 is of a width substantially equal to the width to be given to the inner portion of the warp eye, and of a length substantially equal to the length of the warp eye, and in horizontal section is of a contour substantially similar to the interior contour to be given to the warp eye, and is tapered at its lower end so that it will readily enter the eye. It will be further understood that by reason of its maintenance under the pressure of the spring 73, should it happen that the eye is not in alinement with the plunge when the latter descends, the springs will give, thereby to allow a descent of the slide under the normal operation of the cam and the slide lever, the plunge being arrested by an unperforated portion of the wire, and being allowed to ride upwardly with reference to the slide, until the latter again rises under the influence of its lever, when it is picked up and moved off the wire. By reason of this construction, the plunge will not be damaged, even should it descend upon an unperforated portion of the wire, but will simply rest upon the wire, while the slide descends and again rises, and until the slide picks up the plunge and carries it to a raised position. Thus no danger of the plunge being broken by engaging an unperforated portion of the wire will be experienced, nor will damage occur to the wire.

*Fourth operation—Offsetting or twisting the warp eye*

The warp eye having been plunged and the rod eyes swedged, the wire is drawn another heddle length, to place the warp eye in registration with the eye offset mechanism F.

The latter includes a body casting 103, adjustably mounted longitudinally of the bed plate by the headed bolts 104, and provided with a vertical recess in which is arranged a slide 105, against which a gib 106 bears, such gib being adjustable for wear by the screws 106ª, and being mounted on dowel pins 106ᵇ which extend through the forward wall of the casting into recesses provided in the gib. The recess is open on one side, and through the open side extends a pin 107 carried by the slide on which a block 108 is pivoted. This block is engaged by the jawed end of a lever 109, which is pivoted at 110 on the body casting. A second lever 111 is pivotally connected to the outer end of the lever 109 at 112, and has a jawed lower end which slidably fits on a block 113 which is pivoted on the cam shaft 6. Above the jawed end of the lower lever 111 is arranged a pin 114 on which a roller 115 is journaled, and against this roller a cam 116, which is fixed on the shaft, operates.

The lower end of the slide 105 receives a headed screw 117 which serves to mount an upper die holder 118 on the slide. The screw passes through a vertically elongated slot 119 in the upwardly projecting stem 120 of the die holder, so that the latter may be adjusted vertically with reference to the slide. Formed on the slide above the die holder is an abutment 121 into which a screw 122 is threaded, the head of the screw bearing upon the upper end of the die holder thereby to take up the end thrust of the latter. A lock nut 123 serves to lock the screw in adjusted position. The die holder is recessed as at 124 (see Fig. 38), to receive an upper clamp block 125, and a bore 126 extends upwardly from the recess and accommodates a spring 127. The spring bears at one end against the clamp block 125 and at its other end against the base of the bore 126, and constantly presses the clamp block downwardly.

The clamp block is retained in the die holder by a pair of screws 128, which are arranged at diametrically opposed corners of the block, and only one of which is seen in the drawings, the heads of such screws being positioned downwardly, and being accommodated in recesses 129 provided in the lower face of the clamp block. These screws serve as stops limiting the downward movement of the clamp block under the tension of the spring, and at the same time allow the clamp block to move upwardly relative to the die holder and against the tension of the spring.

The die holder receives the upper offset die 130 which, at its base, is reduced as at 131 and fits a corresponding recess in the die holder. The reduced shank of the die is provided with a flattened surface 132 against which a set screw 133 (see Fig. 40) bears for locking the die in position. The lower end of the die extends downwardly through an opening provided in the clamp block 125, and the spring 127 surrounds the die.

On each end face of the upper die holder is secured by means of screws 134, a pair of wire guides 135, in the form of L-shaped metal strips, the lower opposed faces of which are tapered as at 136 (see Fig. 39). The purpose of the wire guides is to engage the lateral edges of the wire as it passes through the eye offset mechanism, and to aline it with the dies thereof. When the slide descends, if the wire is not already accurately alined, the tapered surfaces of the guides will engage it and shift it laterally in the one direction or the other to bring it into proper alinement. The guides are provided with horizontally elongated slots 137, through which the screws 134 pass, whereby they may be adjusted toward or away from each other to accommodate the width of the wire being run through the machine at the time. They are kept in proper vertical alinement by bearing at their upper ends against shouldered portions 138 at the ends of the die holder.

Mounted upon a forwardly offset portion 139 of the body casting 103 is a lower die holder 140, secured in position by a screw 141 passing through an elongated slot 142 therein. A screw 143 mounted in an abutment 144 of the casting bears against the lower end of the lower die holder and is locked in position by a nut 145. The lower die holder is similar in construction to the upper one, and receives the lower clamp block 146 which is spring-pressed upwardly by the spring 147, also mounted in the lower die holder. Screws 148, arranged at diagonally opposed corners of the lower clamp block, and in opposite corners from those occupied by the screws of the upper clamp block, limit the upward movement of the lower block and at the same time allow it to move downwardly against the tension of its spring 147. A lower offset die 149, which is similar in construction to the upper die, but is reversed in position with respect thereto, is mounted in the lower die holder, and retained in position by the set screw 150.

The upper and lower dies are of cylindrical shape, and at their ends are provided with inclined plane working faces 151 (see Figs. 32—34), which extend diametrically of the die ends in the direction of travel of the wire, the ends of the working faces being rounded as at 152. The working faces are wide enough to accommodate different widths of wire. The shoulders 153, which flank the working faces 151 of the dies are also rounded at their ends. It will also be noted that the adjacent faces of the upper and lower clamp blocks 125 and 146, respectively, adjacent the openings through which the dies 130 and 149 pass, are rounded off as at 154, on the sides of the openings which correspond to the direction of travel of the wire, these rounded off portions being of crescent shape. The inclined working surfaces of the dies are arranged in opposed relationship with respect to each other, as shown in Fig. 40, and due to the rounded ends of such working faces and their flanking shoulders and the rounded surfaces in the clamp block faces, when the dies engage upon opposite sides of the warp eye, continued movement of the dies toward each other twists the warp eye and offsets it into a plane at an angle to the plane of the main body portion of the heddle, such offset, however, gradually merging at its ends with the body portions of the heddle at both ends of the warp eye, in gradual curves. Hence the offset portion comprising the warp eye and the metal adjacent thereto is devoid of sharp turns, shoulders or corners. Furthermore, I have found that this construction of the dies and of the clamp blocks allows the twist being put into the wire, without any tendency to impair either the flat or the edge straightness of the wire, and hence both of the body portions of the heddle at opposite ends of the warp eye remain in alinement with each other, so that there is no bend or twist in the body of the heddle as a whole. Since the twist in the heddle is made on gradual and continuous curves, when the heddles are nested together in correct weaving position, no pockets are formed to resist the passage of the warp when the harnesses are washing their shed.

It will be understood that as the cam 116 engages the roller on the lower lever 111, the latter is moved upwardly, being guided by the block 113. This motion is imparted to the upper lever 109 and the latter, turning upon its pivot, forces the slide down. This motion brings the upper die holder toward the lower one, the wire being engaged between the clamp blocks at both ends of the warp eye, and further movement of the slide thereafter brings the dies and their working surfaces into engagement with the warp eye and imparts a twist to the latter, while the metal of the wire at both ends of the warp eye is firmly gripped between the clamp blocks. As the lobe of the cam passes beneath the roller, the pressure of the springs, and the weight of the levers, moves the slide upwardly, first disengaging the die from the warp eye and thereafter disengaging the upper clamp block and freeing the wire so that the latter is conditioned to be drawn forward for the next operation in the formation of the heddle.

*The fifth operation—Forming the separator offsets*

The warp eye having been offset or twisted, the wire is advanced substantially two heddle lengths, which positions the warp eye intermediate the pair of separator offset forming presses G (see Fig. 1), and locates the terminal portions of the heddle being formed midway between the pairs of dies 155—156 carried by the presses. That is, the portion which will be the upper end of the finished heddle is half way between the dies 155 of the press G, which is farthest from the eye offset press F, while the portion which will be the lower end of the finished heddle is midway between the dies 156 of the separator press, which is nearest the eye offset mechanism F.

The dies on each of the separator presses are spaced apart such a distance that the rod eyes 15ª of the heddles (one being the lower rod eye of one heddle, and the other the upper rod eye of the succeeding heddle, see Figs. 8-8a), occur between the dies of the pair. Thus, as the dies close, offsets 157—158 are formed in the bodies of the heddles adjacent the lower ends of the upper rod eyes and the upper ends of the lower rod eyes, respectively. It will be seen that the dies 155 of the farther press form upwardly extending separator offsets, while the dies 156 of the nearer press form downwardly extending offsets. Each heddle is thus formed with a raised and a depressed offset and the offsets of succeeding heddles are reversed, that is, in one heddle the offset at the lower end of the upper rod eye will be raised, and the offset above the lower rod eye will be depressed, while in the succeeding heddle, the offset at the lower end of the upper rod eye will be depressed and the offset above the lower rod eye will be raised. Since, after separation, the heddles are stacked one on another successively, as they come from the machine, and are in this same condition, strung on the rods of the heddle frames, it will be seen that when so stacked and strung, the raised offsets of alternate heddles will coincide with depressed offsets of the intermediate alternate heddles, and the heddles will thus be kept properly separated in the frame in which they are mounted for use.

The separator offset presses are timed to operate simultaneously, and at half speed with reference to the speed of rotation of the cam shaft, so that the dies having formed the offsets in one heddle, and the adjacent ends of the preceding and succeeding heddle, the wire may be moved two heddle lengths (one for each rotation of the cam shaft) before it is necessary again to actuate the dies.

The separator forming presses are identical, save for the position of their dies, as heretofore explained, and a description of one will therefore suffice for both. One of the separator presses is illustrated in Figs. 42 to 46, inclusive, of the drawings.

It includes the body casting 160, adjustably secured to the bed plate of the machine by the bolts 161, such casting being provided in its upper portion with a vertical recess in which the slide 162 is adapted to reciprocate. The slide is maintained in alinement by a gib 163, which may be adjusted for taking up wear by the screws 164, the gib being mounted on dowels indicated at 159. A plate 165 is secured by screws 166 to the side of the casting and overlies the gib and retains the latter.

The slide adjacent its upper end is provided with a pin 167 on which a block 168 is pivoted, the latter being slidably engaged by the jaws of the lever 169. The lever is pivoted at 170 on the casting and at its lower end carries a roller 171 which bears against a cam 172 mounted on a counter-shaft 173. A gear 174 is also carried by the counter-shaft, and meshes with a gear 175 (of half the number of teeth of gear 174) carried on the cam shaft 6. By this arrangement, the cam causes the actuation of the slide once for every two revolutions of the cam shaft as heretofore set forth. The counter-shaft is journaled in the arms 176 which extend rearwardly from the casting.

The slide 162 has secured to its lower end a T-shaped die holder 177, the stem of which is vertically slotted to receive the attaching screw 178. An adjusting screw 179 provided with a lock nut extends through an abutment 180, formed on the slide, and bears against the upper end of the die holder to take up the thrust of the latter and keep the die holder in adjusted position.

The die holder is provided with a longitudinal T-shaped slot 181 which receives the headed ends of the bolts 182, which maintain the upper members of the pairs of dies 155 in adjusted position on the die holder. The upper edges of these die members abut against a shoulder 183 formed on the die holder. By loosening the bolts 182, the dies may be adjusted toward or away from each other to properly locate the separator offsets to be formed in the heddles.

The upper members of the die pairs are provided with transversely extending recesses 184 and the lower members are provided with projections 185 adapted to displace the metal of the wire O into such recesses as the dies come together upon the wire thereby to form the separator offsets. The projections are of somewhat shorter length than the recesses so that the offsets will gradually merge with the body portions of the heddles by inclined portions 186 (see Fig. 8a), rather than by abrupt shoulders which would otherwise occur were the projections of substantially the same length as the depressions.

The lower die holder 187 is a counterpart of the upper one, being reversed in position with respect thereto, and is secured to the body casting by a screw 188 and is vertically adjustable by the screw 189 which passes through an abutment 190 formed on the body casting. The lower members of the die pairs are adjustably secured in the lower die holder by means of bolts 191, in the same manner as has been described with reference to the upper dies.

It is believed that from the foregoing the construction and operation of the separator offset forming mechanism will be understood without further explanation. The arrangement which I use, providing two presses each having two pairs of separator dies for acting simultaneously on the adjacent ends of three heddles, and the actuation of said presses every two heddle lengths, is new with me, and departs from the old practice which is known to me of having a pair of dies for acting on the adjacent ends of two heddles, providing the dies with opposed forming faces, and shifting the dies back and forth horizontally for bringing alternately the front and rear portions of the dies into operative position, and eliminates additional mechanism for mounting and shifting the dies, and the adjustments, attention, and replacements incident thereto.

*Sixth operation—Upsetting the outer ends of the rod eyes (radii plunge)*

The radii plunge mechanism H is disposed substantially a heddle length from the second of the separator offset presses, and operates on the rod eyes of two adjacent heddles simultaneously. Its purpose is to form a thickened rib or burr 192 (see Figs 8 and 8a), at the upper end of the upper rod eye, and the lower end of the lower rod eye, of each of the heddles. Such ribs or burrs are formed by upsetting the finned or swedged portions 49 at such points. A further purpose of this mechanism is to form the ribs or burrs on a radius which will be greater than half the width of the rod eye, and substantially equal to the radius of the rolled edges of the heddle rods on which the heddles are to be strung when in the frame.

The radii plunge mechanism is illustrated in Figs. 47—49 of the drawings, and includes a base 193 adjustably secured to the bed plate by bolts 194. The upper end of the base is provided with a recess in which a slide 195 is mounted for vertical movement, the slide being provided with a pin 196 on which a block 197 is pivoted, the block being slidably engaged by the upper jawed end of a lever 198. The end of the pin 196 projects through a slot 199 provided in the side of the base casting, and a lubricating fixture 200 may be thus connected with the slide pin.

The lever is pivoted at 201 on the base, and at its lower end is provided with a roller 202, so as to be actuated by a cam 203 on the cam shaft 6, which depresses the slide once for each revolution of the shaft.

A long bolt 204 depends from the lower end of the slide into a bore 205 formed in the base, and this bolt is provided with a shoulder 206, against which the upper end of a spring 207 bears. The lower end of the spring is engaged by a follower 208 screwed into the lower end of the bore. The spring 207, acting through the bolt and the slide, retains the roller in constant contact with the cam.

Interposed between the front face of the slide 195 and the front cover plate 209 is a plunger carrier 210, and such carrier is also vertically reciprocable. On it is secured a pair of plungers 211, which are adapted to cooperate with a die 212 in forming the ribs, as will later be more fully described. Such die is provided with recesses 213 into which the lower ends of the plungers extend when the plungers are down.

When the plungers descend, the lower ends extend into the rod eyes 15ᵃ which occur at adjacent ends of a pair of as yet unseparated heddles.

The opposed edges of the plungers are tapered away from each other downwardly as at 214, and these edges are given a radius of curvature as at 215 (see Fig. 48) which is substantially equal to the radius of curvature of the heddle rods on which the heddles are to be strung. Such radius is greater than half the width of the rod eye openings.

As the plungers descend, the inner working edges engage the edges of the fins 49 formed by the swedging operation, and upset such edges, pressing the metal toward the ends of the eyes and forming the ribs or burrs 192 (see Figs. 8 and 8a). The recesses in the die 212, being of a length greater than the full longitudinal length of the plungers, afford spaces into which the metal may be upset. These ribs or burrs are given the same radius of curvature as the working edges of the plungers, and hence will fit the rolled edges of the heddle rods and will form a widened bearing area extending across the whole width of the heddle rods, and will thus provide good bearing surfaces with a minimum of wear.

In order to prevent breaking the plungers, should the latter descend upon an unperforated part of the wire strip, as when starting the machine, or otherwise, I provide means whereby slippage may occur between the slide 195 and the plunger carrier 210. This means includes a barrel 216 threaded into an opening in the plunger carrier, within which a spring-pressed detent 217 is mounted. The shank of the detent may extend into a hollowed adjusting screw 218, and the spring 219 is positioned between such screw and the head of the detent. The latter is wedge-shaped, and is adapted to engage the similarly shaped slot 220 provided in an insert 221, of hard metal set into the forward face of the slide 195. Due to the action of the spring 219 and the interengagement of the detent 217 with the slide 195, such slide and the plunge carrier normally move up and down in unison.

Should, however, the plungers engage an unperforated part of the strip, their downward motion and that of their carrier will be arrested, while the slide 195 will continue moving. This will disengage the detent from the slide and allow the continued movement of the slide while the plungers and their carrier remain stationary. As the slide again moves up the detent will re-engage the slot in the insert, and again condition the parts for normal operation. A resistance to the downward movement of the plungers is of course offered by their engagement with the ends of the swedged fins 49, but the spring 219 can be adjusted to overcome this resistance, and prevent disengagement of the plunger carrier and slide. Such adjustment, however, will not be sufficient to overcome the resistance offered by the engagement of the plungers with solid portions of the wire, and will allow the slippage of the slide with reference to the plunger carrier when this occurs, as before described, without damage to the plungers or wire.

While the ribs or burrs are being formed, the wire is clamped against the die 212. In order to do this, I provide a clamp plate 222 fixed between the arms 224 of a casting which includes a spring barrel 225, which is slidable in the bore 205 and normally bears against the shoulder 206 of the bolt 204. The plate, under the action of a spring 226 acting on the barrel, is forced downwardly to clamp the wire in position, under the tension of the spring, when the slide 195 descends. The plate 222 is slotted to receive the lower ends of the plungers 211, and to allow the latter to descend into the die 212, and in this way also acts as a guide for the plungers. Wire guides 227 are carried on the outer faces of the arms 224 by screws 223 and have depending fingers between which the wire is guided as it is drawn along and maintained on the upper face of the die 212. The spring 226 surrounds the long bolt 204, bears at its upper end against the lower end of the slide 195, and bears at its lower end against the bottom of the barrel 225 which carries the wire clamp plate. Thus as the slide 195 descends, together with the plunger carrier 210 and the plungers, the wire clamp plate also descends, and engages and clamps the wire firmly against the lower die, while the plungers continue their descent to form the ribs or burrs 192.

The die 212 is mounted in a holder 228, being held therein by a screw 229. The stem of the holder extends downwardly in a recess formed in the front face of the base, and is secured by a screw 230 which passes through a vertically elongated slot in the stem. The lower end of the die stem bears against an adjusting block 231 mounted for horizontal adjustment in a recess 232 of the base, the block being diagonally slotted at 233, and being secured by a screw 234. By loosening the screws 230 and 234, the block 231 may be shifted horizontally in one direction or the other, and due to the inclination of the slot 233, will either raise or lower the die holder, together with the die, thus bringing the die into the proper position to accommodate the gauge of the wire being worked upon. The screws 230 and 234 may then be again tightened to retain the die in adjusted position. The plungers 211 are also adjustable toward and away from each other, being secured to the carrier 210 by means of screws 235 fastened through horizontally elongated slots 236 provided in the bases 237 of the plungers.

The method which I provide for forming the thickened ribs on the rod eyes is quite different from the methods which have heretofore been used, in that the latter utilize rotating fluted spindles which enter the rod eyes and spin the metal back. In such case, however, the spindles have to be of such diameter as to enter the eyes, and hence cannot be of greater radius than half the width of the eye opening. The radius of the spun metal so formed is therefore short as compared with the radius of the reinforcing rib formed by my method, and is shorter than the radius of the rolled edges of the rods on which the heddles are strung. Therefore, with such prior methods, instead of the thickened or burred portion of the eye bearing upon the heddle edge throughout the width of the eye, it engages it only at two points and this results in rapid wear.

In my method, however, the radius of the thickened rib can be made to correspond to that of the rolled edge of the rod, so as to form a wide bearing surface which will engage the rod throughout the width of the latter, and therefore result in less wear, as has been already pointed out, and prolong the useful life of both the heddle and heddle rod. Further, the method I provide does away with the disadvantages flowing from the frequent breakage and short life of the fluted spindles of the prior methods, due to the necessity of using spindles of small diameter and of operating them at high speed.

*Seventh operation—Clamping wire, crimping upper rod eye and cutting-off heddle*

The reinforcing ribs having been formed, the wire is advanced another heddle length, which positions that portion of the wire which will be the upper end of a heddle in registration with the mechanism indicated generally at I, which mechanism performs the last step in the formation of the heddle, and cuts off the preceding heddle which has been drawn out by the metering mechanism. This step consists in crimping the upper rod eye of the heddle, as shown in Figs. 9 and 10 at 238. These crimps form widened bearing points for engaging the lateral sides of the heddle rods, and for preventing the heddles from twisting thereon.

The mechanism is illustrated in Figs. 50 to 59a, inclusive, and includes a base casting 239 having vertical recesses 239a (see Fig. 55) formed on each side thereof, and an opening 240 extending therethrough in registration with the recesses. In one of the recesses there is arranged above the opening an upper crimp slide 241, and below the opening a lower crimp slide 242, and in the other recess there is arranged above the opening an upper cut-off slide 243, and below the opening a lower cut-off slide 244 (see Fig. 50). The upper and lower crimp slides carry crimp dies 245 and 246, respectively, which are formed with mating protuberances and recesses 247 and 248. Each die is formed on one half with a protuberance and a recess, and on the other half with a protuberance and recess which are staggered in relation to those on the first said half. The length of the working faces of the dies substantially equals the length of the upper rod eye of the heddle, and when the dies come together they crimp the rod eye, as shown in Figs. 9 and 10. The crimp slides move in unison toward and away from each other at the same rate of speed.

The upper cut-off slide 243 has attached thereto a punch 249, and the lower cut-off slide 244 has attached thereto a die 250. The cut-off slides also move toward and away from each other in unison, but they are timed to engage the wire and cut it after the crimp dies have crimped the rod eye and have retracted, and while the wire clamp is still in engagement with the wire, as will be hereinafter more fully explained.

The upper crimp slide 241 carries the wire clamp bracket 251 in which a plunger 252, under tension of spring 253 is mounted, an adjusting nut for the spring being provided at 254. Wire guides 255, which are disposed one on each side of the wire, are also carried by the bracket 251. Arranged alongside the base casting 239, and in vertical alinement with the wire clamp plunger 252, is the wire clamp base 256. This base is threaded at its lower end for receiving a headed bolt 257, which engages one of the T-slots of the bed plate A, and at its upper end is threaded to receive a headed bolt 258 against which the wire is adapted to be clamped. This bolt is provided with a lock nut 259 adapted to lock it in adjusted position. The wire clamp base 256 is provided with a hexagonal portion 260, whereby it may be tightened up on the bolt 257, or loosened for adjustment longitudinally of the bed plate. The wire clamp bolt 248 is adjusted to support the wire O, in proper vertical alinement. The wire clamp plunger descends with the upper crimp slide 241, and since the lower end of the bolt extends farther down than the upper crimp die 245, the wire is engaged by the wire clamp and securely held in position before the crimp dies engage the metal of the wire, and said wire clamp continues to clamp the wire after the crimp dies have separated, and after the cut-off dies have separated, and until the jaws 261 (see Fig. 13) of the metering mechanism K have advanced to the cut-off mechanism, and have engaged the cut end of the heddle immediately beyond the upper rod eye, ready to draw the wire out a heddle length. When this has occurred, the further upward movement of the upper crimp slide will disengage the wire clamp and free the wire, so that it may be drawn out.

The cut-off punch 249 and die 250 are each backed by a block 261 having a diagonal slot through which a screw 262 extends for securing the blocks to the upper and lower cut-off slides, respectively, and for allowing adjustment of the punch and die. Screws 263 extend through vertical slots in the punch and die, and secure them to the upper and lower cut-off slides, respectively.

The lower crimp die is similarly mounted on the lower crimp slide, (see Fig. 50) and is secured by a screw 264 extending through an elongated slot in the base of the die, and is backed by an adjusting block 265 retained on the slide by a screw 266. The upper crimp die 245 is clamped to the upper crimp slide by the wire clamp bracket 251, the latter being recessed to receive the shank of the die 245, and being secured to the upper cut-off slide by screws 267 (see Fig. 54). An adjusting block 268, having a diagonal slot through which a screw 269 extends to secure it to the slide 241, takes the thrust of the die 245 and adjusts the latter.

The punch 249 is shaped to sever the heddles by punching out a piece of metal which extends across the width of the wire, and may be shaped as at 270, as shown in dotted lines in Fig. 8. The cut-off die 250 is similarly shaped, as shown at 270' (Fig. 55), and the die has a slot 271 through which the punched out metal is ejected.

The upper and lower crimp slides and cut-off slides are retained in alinement, and wear is taken up, by means of the gibs 272, mounted on dowels 273, which extend through the forward face of the base casting into openings in the gibs, and screws 274 provided with lock nuts are utilized to adjust the gibs properly (see Fig. 54). A brace plate 275 is secured by means of screws 276 on top of the casting, and overlies the slides and gibs.

The upper cut-off slide 243 is actuated by a lever 277 pivoted at 278 on the casting, such lever being forked, one of its forks 279 having its jaw slidably engaging a block 280 pivoted on a pin 281 carried by the upper slide. The other fork 282 of the lever extends downwardly and slidably engages another block 283 pivoted on a pin 284 carried by the upper end of an angular lever 285, the other end of which is jawed and slidably engages a block 286 pivoted on a pin 287 carried by the lower punch slide 244. This lever 285 is pivoted on the base at 288. By this arrangement of levers the punch slides are caused to move up and down simultaneously. A similar arrangement is used to actuate the crimp slides. The upper crimp lever is shown at 289 (see Fig. 53), being pivoted at 290 on the opposite side of the base from the lever 277, and it may be mounted on the same shaft. The upper crimp slide 241 carries a pin and block arrangement at 291 (see Fig. 50), which is engaged by the upper lever 289, and the lower crimp slide has a similar pin and block arrangement 292 engaged by the lower lever which actuates the lower crimp slide, which is indicated at 293. The outer ends of the levers 277 and 289 are pivotally connected to the upper ends of the slide levers 294 and 295, respectively. The lower end of the lever 294 is jawed and slidably engages the guide block 296 journaled on the cam shaft 6, and is provided with a roller 297 which bears against the cut-off cam 298, such cam actuating the cut-off mechanism once for each revolution of the cam shaft.

The crimp actuating lever 295 similarly engages at its lower jawed end a guide block 299 journaled on the cam shaft 6, and is provided with a roller 300 which engages the crimp cam 301. A quadrant 302, having a cam face 303 which coincides with the face 304 of the crimp cam, is arranged alongside the latter, and is adjustable circumferentially of the latter through the medium of bolts 305 which are carried by the crimp cam and extend through arcuate slots 306 in the quadrant; such bolts being provided with nuts for tightening the cam and quadrant together after they have been adjusted. The crimp cam is provided with a lobe 307. It will be observed, from Figs. 52, 57, and 58, that the cut-off cam 298 is so set with reference to the crimp cam as to actuate the cut-off mechanism after the crimp cam has actuated the crimp mechanism, the cam shaft rotating in the direction indicated by the arrow; and it will be further observed that the cam surface of the quadrant does not move from beneath the roller 300 of the crimp actuating lever until after the lobe of the cut-off cam moves from beneath the roller 297 of the lever 294. In other words, the lobe of the cut-off cam 298 is set between the lobe 307 of the crimp cam and the end of the cam surface of the quadrant.

Thus, as the cam shaft rotates, the cam surface 304 will cause the crimp dies to be moved toward each other, this movement also causing the wire to be clamped in the wire clamp. This movement, however, does not bring the crimp dies together upon the wire until the lobe 37 of the crimp cam comes into play. The lobe is comparatively short in length, and thus causes a quick actuation of the crimp dies. The position of the dies and the wire clamp just before and just after the cam lobe 307 comes into play, is shown in Fig. 51, the position of the parts in Fig. 50 being that assumed when the mechanisms are fully open and the wire is being drawn through the machine.

The crimp having been formed, and while the parts are still in the position shown in Fig. 51, the lobe of the cut-off cam comes into play and causes the cut-off mechanism to sever the preceding heddle from the remainder of the wire. This having been done, the crimp and wire clamp mechanism are still in the position shown in Fig. 1, and the cut-off dies are separated. This makes room for the jaws of the metering mechanism to engage the length of wire projecting outwardly from between the crimp dies. As the jaws of the metering mechanism are about to engage the free end of the wire, the cam surface 303 of the quadrant passes from beneath the roller of the crimp lever mechanism to allow the crimp dies to separate further. In the meantime the wire is still engaged by the wire clamp mechanism and it is not until the jaws of the metering mechanism have engaged the free end of the wire, and are in condition to draw the wire, that the clamp mechanism is separated as the slope of the quadrant passes beneath the roller 300.

By the use of the quadrant and its capability of adjustment with reference to the crimp cam, and the ability of the crimp cam and cut-off cam to be adjusted to different angular positions with reference to each other around the cam shaft, the timing of the operations that have been described can be precisely set to satisfy the required conditions. It will be noted that the cut-off cam and crimp cam are formed integrally with bushings 308 and 309, respectively, which bushings, by means of set screws 310 and 311, are fastened in adjusted position on the cam shaft. The quadrant 302 fits upon the bushing 309 of the crimp cam, and rests flatly against the latter, the roller 300 being of a width equal to the combined thickness of the cam and its quadrant.

The method which I use for combining the crimping of the upper rod eye with the cutting off of the heddles, departs from prior practice, in which the cutting off operation was made a separate step in the formation of the heddles. According to my method I combine the operations, and thereby eliminate the necessity of separate means for crimping the upper rod eyes.

*Wire-metering operation*

The mechanism indicated generally at K (see Fig. 13) is not new with me, and I do not claim it, and therefore a detailed description of it is unnecessary. Suffice to say that it includes a cross head 312 which reciprocates longitudinally of the machine, and within which are carried the gripping jaws 261 which, when a heddle has been cut off as heretofore described, engages the free end of the wire at a point between the dies of the cut-off mechanism, and draws the wire out a heddle length to the position indicated in Fig. 13, to position the heddle which comprises the drawn out length of the wire in condition to be cut off by the cut-off mechanism. As soon as the heddle is severed, the jaws open and free the wire as the pins enter the rod openings and allow the heddle to be carried out transversely by the take-out mechanism L, to be hereinafter more fully described. The cross head is moved back and forth longitudinally of the machine through the medium of a rod 313 pivoted at its forward end to the cross head, and threaded at its rear end in a sleeve 314 which is pivoted to the upper end of a slotted lever 315, which lever at its lower end is pivoted at 316 to a fixed arm 317 carried by the machine.

A crank arm 318, having a roller 319, is carried by a shaft (not shown) which extends transversely of the machine and which, by means of gears 320, is driven from the cam shaft of the machine. Such roller engages the slot of the lever 315, and as the crank arm rotates, oscillates the lever 315 back and forth to move the cross head. By means of a screw 321 on which the mounting means for the roller 319 is carried, the throw of the cross head may be adjusted, so that the proper length of wire may be drawn out on each complete reciprocation of the jaws 261 of the metering mechanism. The details of the operation of the jaws whereby they are made to close when they engage the new cut end of the wire, and whereby they are made to open when they reach the outer end of their movement in order to let go of the drawn out heddle, are not necessary to be gone into here, as they are known.

*Takeout operation—Transfer rods—Receiver*

A finished heddle having been drawn out by the metering mechanism, and having been cut off, the jaws of the metering mechanism open, and allow the take-out mechanism L to operate in the manner pointed out in detail in the aforementioned original application. The latter mechanism carries the heddle transversely of the machine to place it upon the transfer rods M, to be eventually stacked upon the receiver N, while the metering mechanism is moving back to draw out another heddle.

The foregoing detailed description of my heddle making machine has been given for purposes of clearness of understanding and no undue limitations are to be deduced therefrom, but the claims should be construed as broadly as permissible, in view of the prior art.

I claim:

1. A metal heddle provided with a warp eye offset to occupy a plane at an angle to the plane of the body portion of the heddle, said offset merging gradually into the body of the heddle at the upper and lower extremities of the eye along gradual and continuous curves, whereby when the heddle is nested with similar heddles in correct weaving position no pockets will be formed to resist the passage of the warp when the harnesses make their shed.

2. A metal heddle provided with a rod eye, the outer end of the eye being provided with a thickened rib, the radius of the rib being greater than half the width of the interior of the rod eye.

3. In the manufacture of heddles from a metal wire in a continuous process, the method comprising simultaneously punching slots for forming the rod eyes and the warp eye of a heddle, thereafter deforming the walls surrounding the slot of the warp eye, to strengthen them and render them round and smooth; thereafter simultaneously spreading the walls of the warp eye and swedging the rod eyes; thereafter offsetting the warp eye along continuous gradual curves while holding the heddle in clamped condition; thereafter forming separator offsets adjacent the rod eyes of adjacent heddles; thereafter upsetting the outer ends of the warp eyes of adjacent heddles simultaneously to form wide bearing surfaces, and thereafter clamping the wire and crimping the upper rod eye while the wire is still clamped, and cutting off a preceding heddle, and thereafter releasing the wire.

4. In the manufacture of a metal heddle, the method of forming the warp eye portion of the heddle which comprises successively punching a longitudinal slot in a blank, and pressing the walls surrounding the slot from opposite sides while confining the outside edges of the eye portion to strengthen said walls and render them round and smooth.

5. In the manufacture of a metal heddle, the method of forming the warp eye comprising punching a slot in the metal, applying presses for rounding the walls of the metal defining the slot and compressing the metal thereof, and thereafter applying a plunge for spreading the side walls of the slot apart without otherwise deforming the walls.

6. In the manufacture of a metal heddle, the method comprising swedging the outer end of a rod eye of the heddle to open said eye, and thereafter plunging said swedged end to provide a thickened rib along a radius of curvature greater than half the width of the interior of the rod eye.

7. In the manufacture of a metal heddle, the method which comprises plunging the outer end of a rod eye of the heddle along a radius of curvature greater than half the width of the interior of the rod eye to form a thickened rib thereon.

8. In the manufacture of heddles, the method of forming rod eyes therein which comprises the following successive steps upon a blank: punching slots for the rod eyes, swedging the slots to open the eyes, and plunging the outer ends of the rod eyes to upset said ends.

9. In the manufacture of heddles, the method of forming rod eyes therein which comprises the following successive steps upon a blank: punching slots for the rod eyes, swedging the slots to open the eyes, plunging the outer ends of the rod eyes to upset said ends, and crimping one of said eyes.

10. In the process of manufacturing heddles, the method which comprises advancing a heddle to a predetermined location, clamping the heddle and while so clamped crimping a rod eye and cutting the heddle off.

11. In the manufacture of heddles, the method of forming warp eyes therein comprising the following successive steps: first punching the warp eye slot from a blank, then introducing presses into the warp eye slot to smooth the inner edges thereof, and thereafter plunging the warp eye to spread its edges.

12. In the manufacture of heddles, the method of forming warp eyes therein comprising the following successive steps: first punching a warp eye slot from a blank, then introducing presses from opposite directions into the warp eye slot to smooth the inner edges thereof, thereafter plunging the warp eye slot to spread its edges, and finally twisting said warp eye to an offset position while maintaining gradual and continuous curves between said eye and the remaining portions of said blank.

13. In the manufacture of heddles, the method of forming warp eyes therein comprising the following successive steps: first punching the warp eye from a blank, then pressing the eye from opposite sides to smooth the inner edges thereof, thereafter plunging the warp eye to spread its edges, and finally twisting said warp eye to an offset position while maintaining gradual and continuous curves between said eye and the remaining portions of said blank.

14. In the process of manufacturing heddles, the successive steps of forming warp eyes therein comprising first punching the warp eye from a blank, then pressing the warp eye from above while supporting the eye from below to smooth the inner edges of the warp eye, thereafter plunging the warp eye to spread its edges, and finally twisting said warp eye to an offset position while maintaining gradual and continuous curves between said eye and the remaining portions of said blank.

15. The step in the manufacture of heddles which comprises pressing the warp eye portion from opposite sides to smooth the inner edges thereof while confining the outside edges of said eye portion.

16. The step in the manufacture of heddles which comprises pressing the warp eye portion from above while supporting the eye portion from below to smooth the inner edges thereof and simultaneously therewith confining the outside edges of said eye portion.

RALPH RAGAN.